(12) United States Patent
Ely et al.

(10) Patent No.: US 7,030,782 B2
(45) Date of Patent: Apr. 18, 2006

(54) POSITION DETECTOR

(75) Inventors: David T. E. Ely, Cambridgeshire (GB);
Ross P. Jones, Cambridgeshire (GB);
James M. C. England, Cambridgeshire (GB); Alexander W. McKinnon, Cambridgeshire (GB); Robert M. Pettigrew, Cambridgeshire (GB);
Andrew N. Dames, Cambridge (GB);
Andrew R. L. Howe, Essex (GB)

(73) Assignee: Synaptics (UK) Limited, Cambridge (GB)

( * ) Notice: Subject to any disclaimer, the term of this patent is extended or adjusted under 35 U.S.C. 154(b) by 35 days.

(21) Appl. No.: 10/796,164

(22) Filed: Mar. 10, 2004

(65) Prior Publication Data

US 2004/0169594 A1   Sep. 2, 2004

Related U.S. Application Data

(60) Division of application No. 10/278,984, filed on Oct. 24, 2002, which is a division of application No. 09/627,423, filed on Jul. 27, 2000, now Pat. No. 6,489,899, which is a continuation of application No. 09/111,885, filed on Jul. 8, 1998, now Pat. No. 6,249,234, which is a continuation-in-part of application No. 08/737,505, filed on Dec. 12, 1996, now Pat. No. 5,815,091.

(30) Foreign Application Priority Data

| May 14, 1994 | (GB) | ............................ 9409711.0 |
| Aug. 26, 1994 | (GB) | ............................ 9417353.1 |
| Oct. 3, 1994 | (GB) | ............................ 9420597.8 |
| Nov. 25, 1994 | (GB) | ............................ 9423861.5 |
| May 15, 1995 | (GB) | .................... PCT/GB95/01095 |
| Jun. 17, 1997 | (GB) | ............................ 9712735.1 |
| Jun. 23, 1997 | (GB) | ............................ 9713221.1 |
| Nov. 27, 1997 | (GB) | ............................ 9725133.4 |

(51) Int. Cl.
*G08B 11/00* (2006.01)

(52) U.S. Cl. .................. 341/20; 345/173; 345/174; 345/179; 178/18.07; 178/19.03; 178/20.02

(58) Field of Classification Search ............... 341/20; 345/156, 157, 173, 179; 178/18.06, 18.07, 178/19.03, 20.02; 701/37
See application file for complete search history.

(56) References Cited

U.S. PATENT DOCUMENTS 2,145,742 A   1/1939   Wechsung
(Continued)

FOREIGN PATENT DOCUMENTS

DE   1134848   8/1962
(Continued)

OTHER PUBLICATIONS

Patent Abstracts of Japan, vol. 010, No. 009, (P-420), Jan. 14, 1986 & JP 60 165512A (Toshiba KK), Aug. 28, 1985.

(Continued)

*Primary Examiner*—Albert K. Wong
(74) *Attorney, Agent, or Firm*—Nixon & Vanderhye P.C.

(57) ABSTRACT

A position detector is provided for detecting the relative movement of first and second members which are mounted for relative movement along a measuring path. One of the members comprises a magnetic field generator for generating a magnetic field and the other member comprises first and second conductors which are inductively coupled to said magnetic field generator. The arrangement of the first and second conductors and the magnetic field generator is such that output signals are generated in a first and second receive circuits whose position varies with the relative movement between the two members. In addition to carrying information relating to the relative position between the two members, the signals induced in the receive circuits also comprise information defining the relative orientation of the two movable members, and by suitable processing of the received signals the relative orientation of the two members can also be determined. In a preferred form of the invention, the system operates to define the relative position and orientation of the two movable members in first and second directions from which the relative orientation of the two members in a plane containing the two directions can be determined. The signals induced in the receive circuits can also be processed to give an indication of the gap between the two circuits and to provide an indication of the full relative orientation of the two members.

17 Claims, 19 Drawing Sheets

U.S. PATENT DOCUMENTS

| | | | |
|---|---|---|---|
| 2,867,783 A | 1/1959 | Childs | |
| 2,942,212 A | 6/1960 | Mynall | |
| 3,219,956 A | 11/1965 | Newell et al. | |
| 3,297,940 A | 1/1967 | Mulligan et al. | |
| 3,482,242 A | 12/1969 | Hargrove | |
| 3,647,963 A | 3/1972 | Bailey | |
| 3,772,587 A | 11/1973 | Ferrand et al. | |
| 3,812,481 A | 5/1974 | Stednitz | |
| 3,851,242 A | 11/1974 | Ellis | |
| 3,895,356 A | 7/1975 | Kraus | |
| 3,898,635 A | 8/1975 | Kulterman | |
| 3,906,436 A | 9/1975 | Kurauchi et al. | |
| 3,962,663 A | 6/1976 | Visser | |
| 4,005,396 A | 1/1977 | Fujiwara et al. | |
| 4,014,015 A | 3/1977 | Gundlach | |
| 4,065,850 A | 1/1978 | Burr et al. | |
| 4,081,603 A | 3/1978 | Davis et al. | |
| 4,092,852 A | 6/1978 | Fowler et al. | |
| 4,094,572 A | 6/1978 | Burr et al. | |
| 4,097,684 A | 6/1978 | Burr | |
| 4,150,352 A | 4/1979 | Pomella et al. | |
| 4,156,192 A | 5/1979 | Schedrovitsky et al. | |
| 4,210,775 A | 7/1980 | Rodgers et al. | |
| 4,223,300 A | 9/1980 | Wiklund | |
| 4,255,617 A | 3/1981 | Carau, Sr. et al. | |
| 4,341,385 A | 7/1982 | Doyle et al. | |
| 4,423,286 A | 12/1983 | Bergeron | |
| 4,425,511 A | 1/1984 | Borsh | |
| 4,482,784 A | 11/1984 | Whetstone | |
| 4,504,832 A | 3/1985 | Conte | |
| 4,507,638 A | 3/1985 | Brosh | |
| 4,532,376 A | 7/1985 | Rockwell | |
| 4,577,057 A | 3/1986 | Blesser | |
| 4,593,245 A | 6/1986 | Viertl et al. | |
| 4,609,776 A | 9/1986 | Murakami et al. | |
| 4,642,321 A | 2/1987 | Schoenberg et al. | |
| 4,693,778 A | 9/1987 | Swiggett et al. | |
| 4,697,144 A | 9/1987 | Howbrook | |
| 4,697,244 A | 9/1987 | Murakami et al. | |
| 4,704,501 A | 11/1987 | Taguchi et al. | |
| 4,709,209 A | 11/1987 | Murakami et al. | |
| 4,711,026 A | 12/1987 | Swiggett et al. | |
| 4,711,977 A | 12/1987 | Miyamori et al. | |
| 4,723,446 A | 2/1988 | Saito et al. | |
| 4,734,546 A | 3/1988 | Landmeier | |
| 4,737,698 A | 4/1988 | McMullin et al. | |
| 4,786,765 A | 11/1988 | Yamanami et al. | |
| 4,820,961 A | 4/1989 | McMullin | |
| 4,848,496 A | 7/1989 | Murakami et al. | |
| 4,868,443 A | 9/1989 | Rossi | |
| 4,878,553 A | 11/1989 | Yamanami et al. | |
| 4,891,590 A | 1/1990 | Hammel et al. | |
| 4,893,077 A | 1/1990 | Auchterlonie | |
| 4,902,858 A | 2/1990 | Yamanami et al. | |
| 4,963,703 A | 10/1990 | Phillips | |
| 4,975,546 A | 12/1990 | Craig | |
| 4,985,691 A | 1/1991 | Pulyer et al. | |
| 4,988,837 A * | 1/1991 | Murakami et al. | 178/18.07 |
| 4,999,461 A | 3/1991 | Murakami et al. | |
| 5,013,047 A | 5/1991 | Schwab | |
| 5,028,745 A | 7/1991 | Yamanami et al. | |
| 5,041,785 A | 8/1991 | Bogaerts et al. | |
| 5,059,180 A * | 10/1991 | McLees | 604/110 |
| 5,082,286 A | 1/1992 | Ryan et al. | |
| 5,088,928 A | 2/1992 | Chan | |
| 5,129,654 A | 7/1992 | Bogner | |
| 5,136,125 A | 8/1992 | Russell | |
| 5,177,389 A | 1/1993 | Schalk | |
| 5,188,368 A | 2/1993 | Ryan | |
| 5,218,174 A * | 6/1993 | Gray et al. | 178/20.02 |
| 5,225,637 A * | 7/1993 | Rodgers et al. | 178/19.03 |
| 5,239,489 A * | 8/1993 | Russell | 701/37 |
| 5,381,091 A | 1/1995 | Kobayashi et al. | |
| 5,406,155 A | 4/1995 | Persson | |
| 5,434,372 A | 7/1995 | Lin | |
| 5,486,731 A | 1/1996 | Masaki et al. | |
| 5,619,431 A | 4/1997 | Oda | |
| 5,625,239 A | 4/1997 | Persson et al. | |
| 4,878,553 A | 9/1997 | Yamanami et al. | |
| 5,691,513 A * | 11/1997 | Yamamoto et al. | 178/18.07 |
| 5,693,993 A | 12/1997 | Ito et al. | |
| 5,748,110 A | 5/1998 | Sekizawa | |
| 5,783,940 A | 7/1998 | Kolomeitsev | |
| 5,815,091 A | 9/1998 | Dames | |
| 6,124,708 A | 9/2000 | Dames | |
| 6,262,684 B1 * | 7/2001 | Stewart et al. | 343/702 |
| 6,288,710 B1 * | 9/2001 | Lee et al. | 345/173 |
| 6,667,740 B1 * | 12/2003 | Ely et al. | 345/179 |
| 6,797,895 B1 * | 9/2004 | Lapstun et al. | 178/19.05 |
| 6,798,404 B1 * | 9/2004 | Sharma | 345/173 |

FOREIGN PATENT DOCUMENTS

| | | |
|---|---|---|
| DE | 3500121 A1 | 7/1986 |
| DE | 3620412 A1 | 12/1987 |
| EP | 0159191 A2 | 10/1985 |
| EP | 0182085 A2 | 5/1986 |
| EP | 0182085 A3 | 5/1986 |
| EP | 0209513 A1 | 6/1986 |
| EP | 0218745 A1 | 4/1987 |
| EP | 0313046 A1 | 4/1989 |
| EP | 0537458 A1 | 4/1993 |
| EP | 0552001 A1 | 7/1993 |
| EP | 0554900 A1 | 8/1993 |
| EP | 0607694 A1 | 7/1994 |
| EP | 0657917 A1 | 6/1995 |
| EP | 0675581 A1 | 10/1995 |
| EP | 0680009 A2 | 11/1995 |
| EP | 0709648 A2 | 5/1996 |
| EP | 0716390 A1 | 6/1996 |
| EP | 0743508 A2 | 11/1996 |
| EP | 0772149 A1 | 5/1997 |
| FR | 1325017 | 3/1962 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2042183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2141235 A | 12/1984 |
| WO | WO 92/12401 | 7/1992 |
| WO | WO 94/25829 | 11/1994 |
| WO | 95/31696 | 11/1995 |
| WO | WO 96/03188 A1 | 2/1996 |
| WO | WO 97/14935 | 4/1997 |
| WO | WO 98/00921 | 1/1998 |

OTHER PUBLICATIONS

Klatt, "Phase of Digital Data Fixes Shaft Angle", Electrical Design News, vol. 16, No. 12, Jun. 15, 1971, pp. 53-56, XP002045871.

Patent Abstracts of Japan, vol. 15, No. 37 (P-1159), Jan. 29, 1991 & JP 02 275314 A (Omron Tateisi Electron Co), Nov. 9, 1990.

Patent Abstracts of Japan, vol. 10, No. 32 (E-379), Feb. 7, 1986 & JP 60 189231 A (Matsushita Denki Sangyo KK, Sep. 26, 1985.

McDonnel, "The Use of Inductosyn to Digital Converters in Linear Control Systems", AUTOMATION, vol. 10, No. 11-12, Nov. 1975-Dec. 1975, pp. 31-32.

Electronics Letters, vol. 11, No. 1, Jan. 9, 1975, pp. 5-6, Gordon, Digital xy Position Indicator Using Walsh Functions.

Pulle et al, "A New Magnetoresistive Based Sensor for Switched Reluctance Drives" Proceedings of the Annual Power Electronics Specialists Conference (PECS), Toledo, Jun. 29-Jul. 3, 1992, vol. 2, No. Conf, 23, Jun. 29, 1992, pp. 839-843, Institute of Electrical and Electronics Engineers.

* cited by examiner

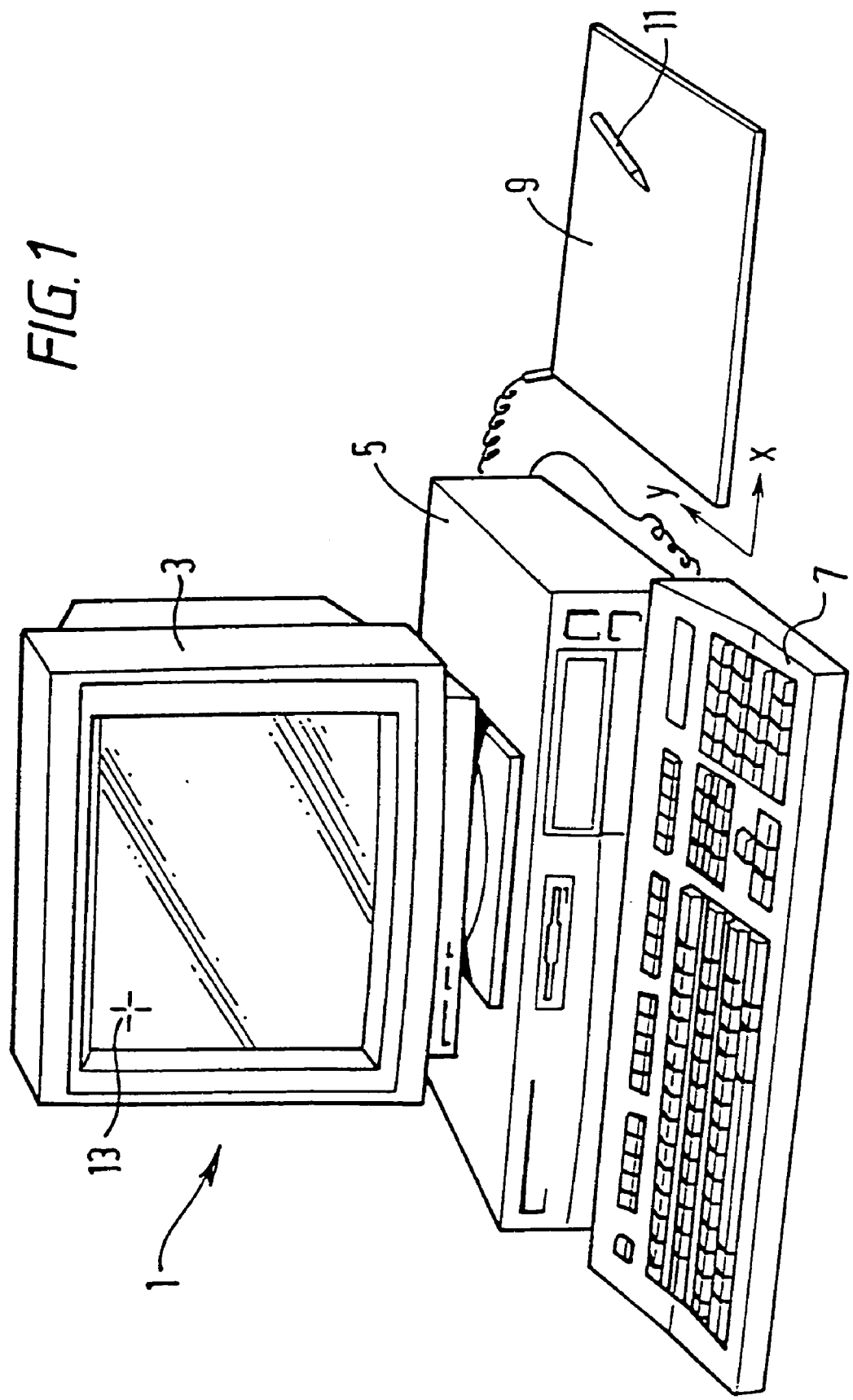

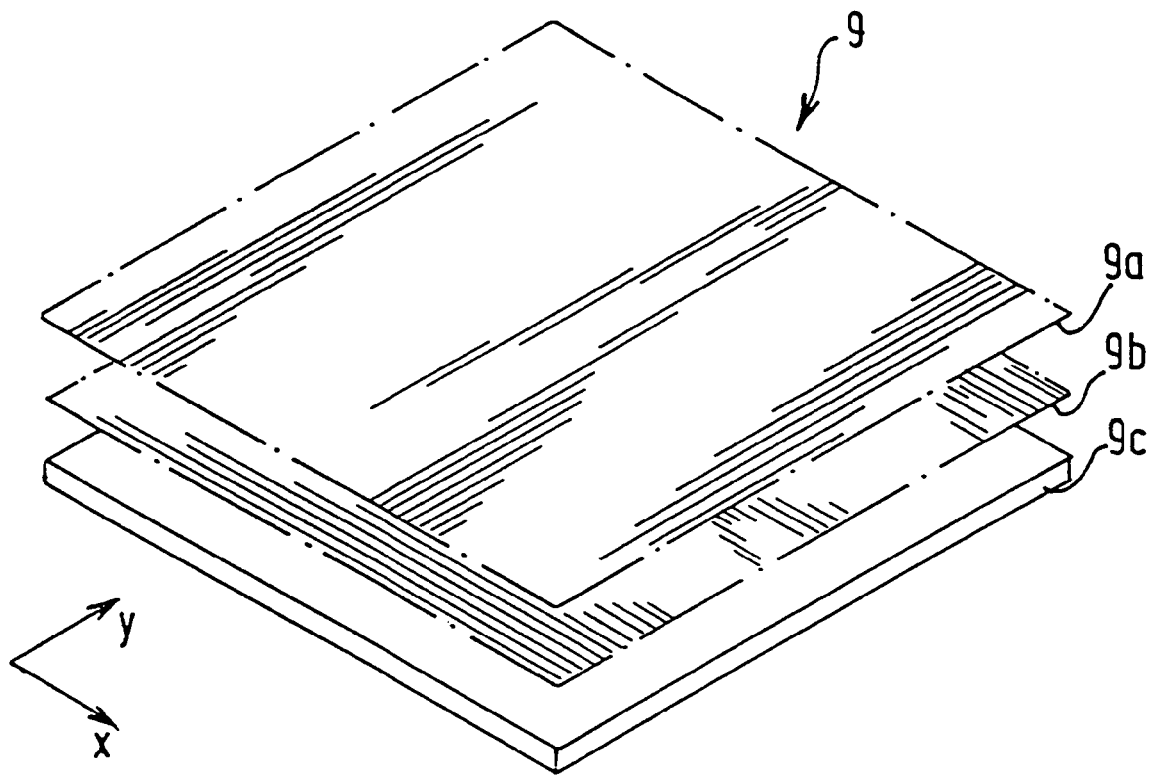
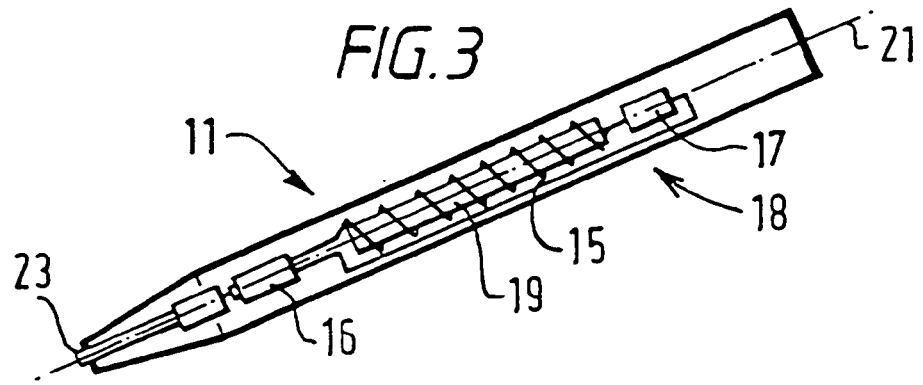

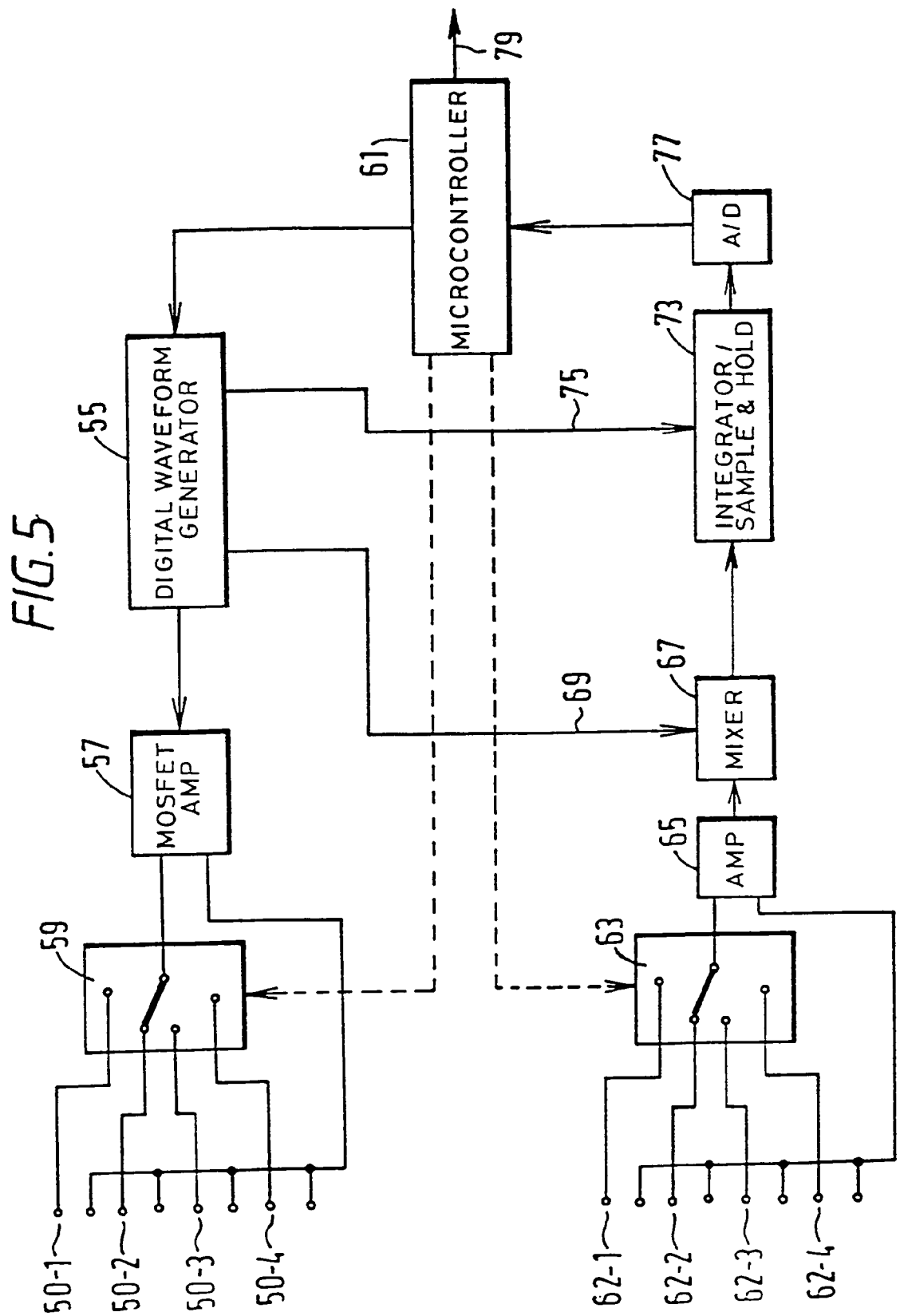

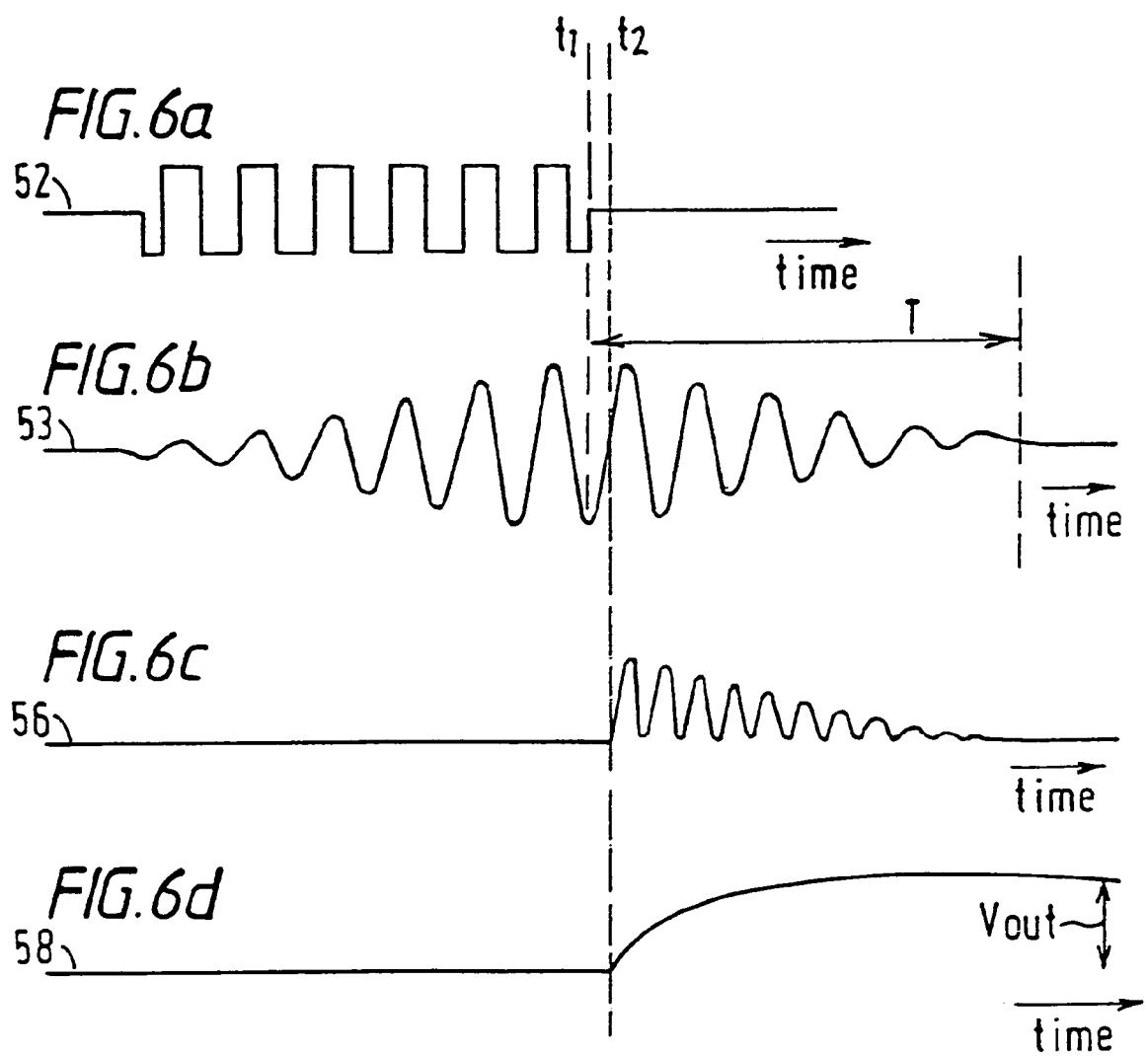

FIG. 7a
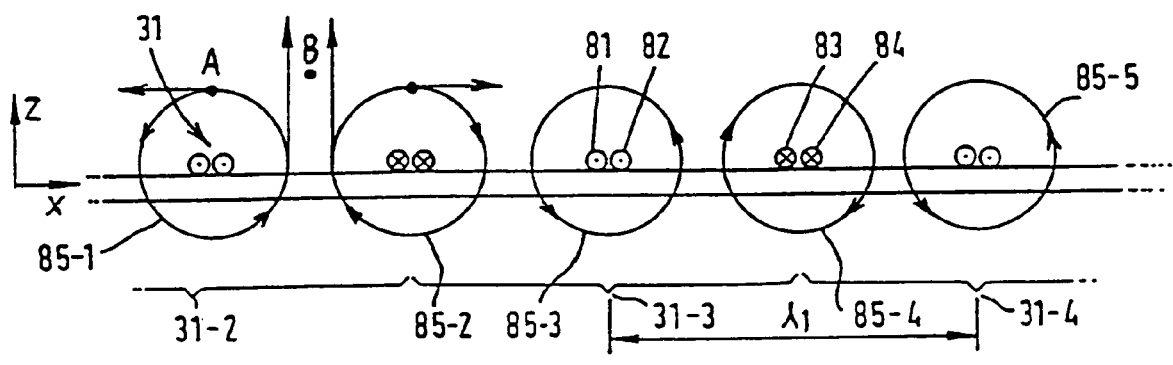
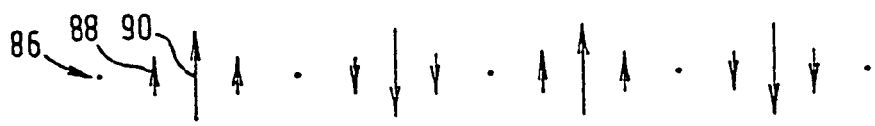
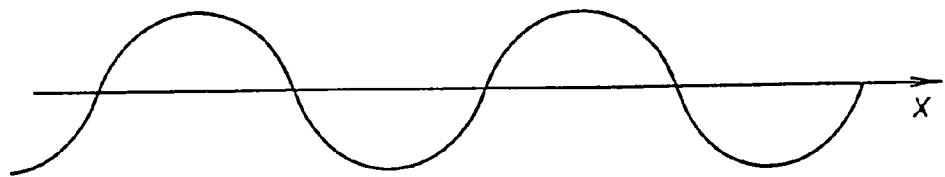
FIG. 7b
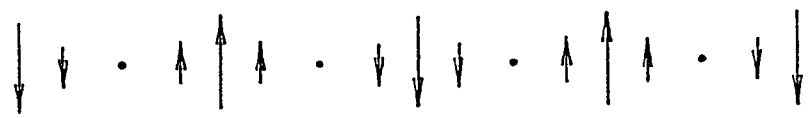
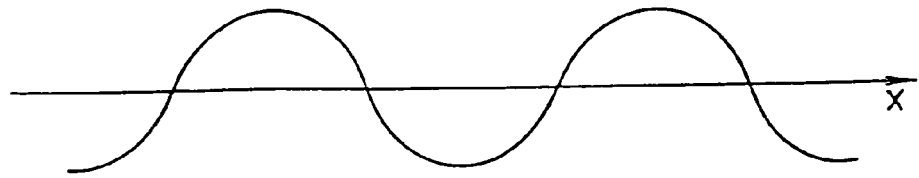
FIG. 7c

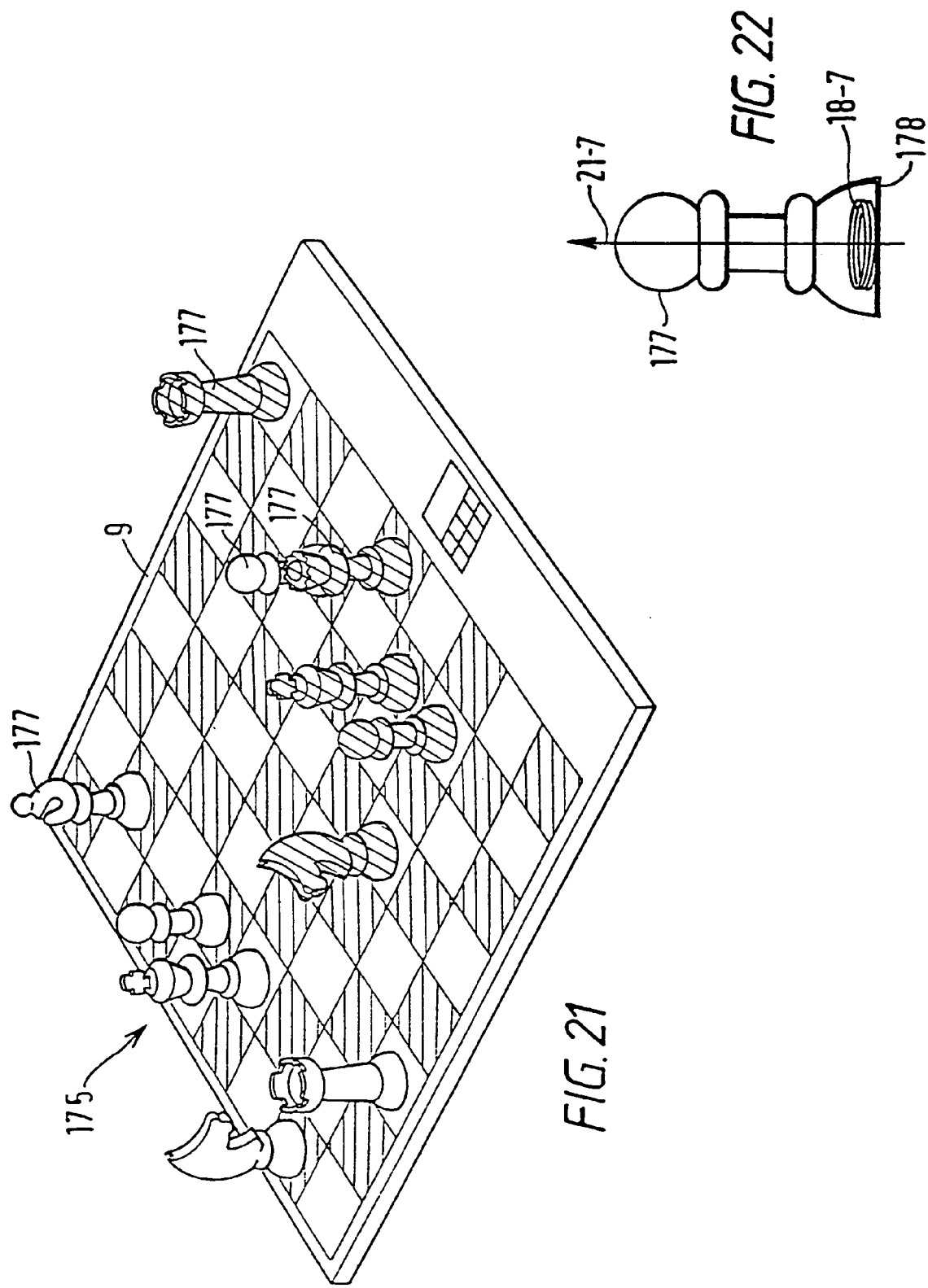

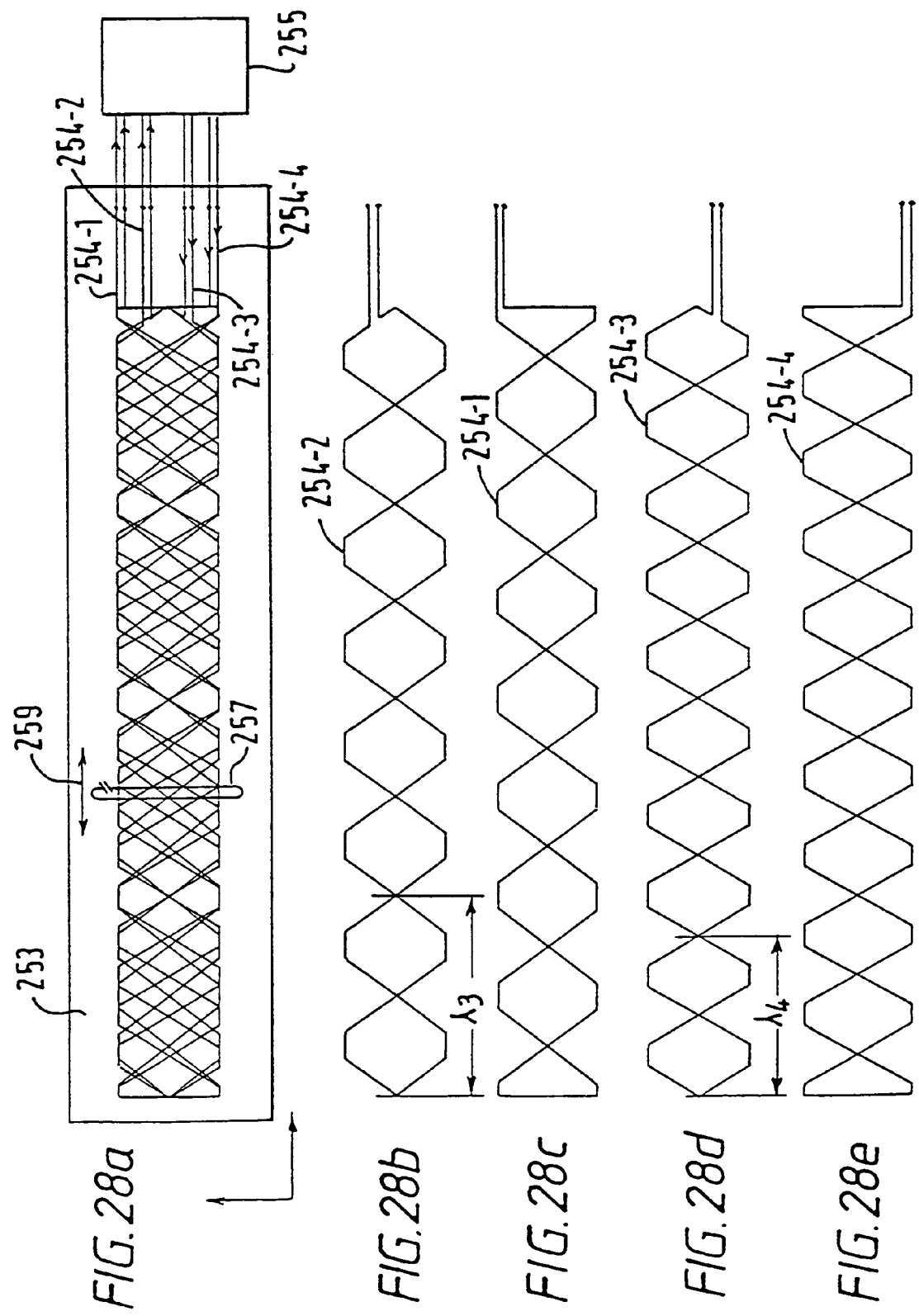

POSITION DETECTOR

RELATED APPLICATIONS

This is a division of application Ser. No. 10/278,984 filed Oct. 24, 2002 which is a division of application Ser. No. 09/627,423 filed Jul. 27, 2000 now U.S. Pat. No. 6,489,899 (now allowed) which is, in turn, a continuation of application Ser. No. 09/111,885 filed Jul. 8, 1998 (now U.S. Pat. No. 6,249,234). Although no domestic priority is claimed prior to Jul. 8, 1998, it is noted that application Ser. No. 09/111,885 was, in turn, a continuation-in-part of application Ser. No. 08/737,505 filed Dec. 12, 1996 (now U.S. Pat. No. 5,815,091 issued Sep. 29, 1998), the contents of which are incorporated by reference. This application is also related to copending divisional application Ser. No. 10/108,266 filed Mar. 28, 2002.

BACKGROUND OF THE INVENTION

1. Field of the Invention
2. Related Art

The present invention relates to position sensors generally. The invention has particular although not exclusive relevance to non-contact linear and rotary position encoders. The invention is particularly suited for use in systems where the object whose position is being sensed can be tilted relative to the measurement direction.

Many types of non-contact linear and rotary position encoders have been proposed for generating signals indicative of the position of two relatively moveable members. Typically, one of the members carries one or more sensor coils and the other carries one or more magnetic field generators. The magnetic field generators and the sensor coils are arranged such that the amount of magnetic coupling between them varies as a function of the relative position between the two members. This can be achieved by, for example, designing the sensor coils so that their sensitivity to magnetic field varies in a predetermined manner along the measurement path. Alternatively, the magnetic field generators can be designed so that the magnetic field which they generate varies in a predetermined manner along the measurement path.

One example of this type of position encoder is the Inductosyn, which comprises a contactless slider which is arranged to detect the field generated by a stationary track, or vice versa. The stationary track comprises a repeating pattern of conductors which generates a magnetic field of substantially sinusoidal variation in the measurement direction when a current is applied to them. This magnetic field is detected by the moving slider, which comprises sin and cos detector tracks. The position of the two relatively moveable members is then determined from the spatial phase of the signals detected by these two detector tracks.

The applicant has proposed in its earlier International Application WO95/31696, a similar type of position encoder in which one member carries an excitation coil and a number of sensor coils and the other member carries a resonator. In operation, the excitation coil energises the resonator which in turn induces signals in the sensor coils which sinusoidally vary with the relative position between the two members. A similar system is disclosed in EP 0182085 which uses a conductive screen in place of the resonator. However, the use of the conductive screen in place of the resonator has the disadvantages that the output signal levels are much smaller and that the system cannot be operated in a pulse-echo mode of operation, in which a short burst of excitation current is applied to the excitation winding and then, after the excitation current has ended, detecting and processing the signals induced in the sensor coils.

A problem common to all of these known position sensors is that a positional error is introduced into the measurements if the moveable member is tilted relative to the other member. In some applications, such as machine tool applications, it is possible to physically restrict the movement of the two relatively moveable members, e.g. by using guide rails or the like. However, sometimes this is not possible. For example, in an X-Y digitising tablet, such as the one described in U.S. Pat. No. 4,848,496, the moveable member (the stylus) is moved by a human operator and its tilt relative to the tablet varies considerably during normal use.

Most digitising tablets which have been proposed to date employ a large number of overlapping but separate excitation and sense coils which are spread over the active area of the digitising tablet. The system identifies the current position of the stylus by detecting the excitation and sensor coil combination, which provides the greatest output signal levels. Some systems, such as the one disclosed in U.S. Pat. No. 4,848,496 mentioned above, perform a quadratic type interpolation to try to determine more accurately the current position of the stylus. However, this type of system suffers from the problem that it requires a large number of excitation coils, which must be individually energised, and a large number of sensor coils, which must be individually monitored for each energised excitation coil. There is therefore a trade off between the system's response time and the accuracy of the tablet. In particular, for high accuracy, a large number of excitation and sense coils are required, however, as the number of excitation coils and sensor coils increases, the system's response time decreases. The number of excitation and sense coils used in a given system is therefore governed by the required application.

EP-A-0680009 discloses such a digitising tablet system which is also arranged to process the signals from the different sensor coils in order to determine the orientation of the stylus in the X-Y plane.

SUMMARY OF THE INVENTION

The present invention aims to at least alleviate some of these problems with the prior art position sensors and to provide an alternative technique for determining the orientation of, for example, a stylus relative to a digitising tablet.

According to one aspect, the present invention provides a position detector comprising first and second members mounted for relative movement along a measuring path; said first member comprising a magnetic field generator for generating a magnetic field; said second member comprising first and second conductors which are inductively coupled to said magnetic field generator, the magnetic coupling between said first conductor and said magnetic field generator varying with a first spatial frequency and the magnetic coupling between said second conductor and said magnetic field generator varying with a second different spatial frequency, as a result of which, in response to a magnetic field generated by said magnetic field generator, a first signal is generated in a first receive circuit which first signal varies in dependence upon the relative position and orientation of the first conductor and the magnetic field generator and a second different signal is generated in a second receive circuit which second signal varies in dependence upon the relative position and orientation of the second conductor and the magnetic field generator; and means for processing said first and second signals to determine the relative position and orientation of the two moveable members in dependence upon said first and second spacial frequencies.

The different spatial frequency variations of the output signals are preferably achieved by shaping the conductors in a predetermined manner over the measurement path. In particular, the two conductors preferably extend in a geometrically varying manner having different characteristic dimensions along the measurement path. This can be achieved, for example, by using windings having a different pitch along the measurement path. By using such windings, a position measurement can be obtained across the entire measurement path and an indication of the relative tilt of the two members in the measurement direction can be obtained. This system therefore avoids the need for having a large number of overlapping windings which are spread out over the measurement path and therefore does not suffer from the problems discussed above.

By providing a similar position detector for detecting the relative position and orientation of the two members in a second direction, the relative orientation in a plane containing the two directions can be determined. Further still, by providing two or more magnetic field generators on the first member, the complete relative orientation of the two members can be determined from the signals provided by the two or more magnetic field generators. Therefore, a complete six degrees of freedom position detector can be provided for detecting the position of an object over a planar set of windings. The system does not require a set of windings in two different planes which are inclined at an angle to each other. This position detector is therefore suitable and convenient for many applications especially children's toys and games and for use in controlling a pointing device on a personal computer, where the windings are embedded behind, for example, the LCD screen.

BRIEF DESCRIPTION OF THE DRAWINGS

Exemplary embodiments will now be described with reference to the accompanying drawings in which:

FIG. 1 schematically illustrates a computer system having a X-Y digitising tablet for inputting data into the computer system;

FIG. 2 schematically illustrates an exploded view of the digitising tablet shown in FIG. 1, which generally shows two groups of windings which form part of the digitising tablet and which are used to sense the X-Y position of a stylus relative to the digitising tablet;

FIG. 3 schematically illustrates the form of a stylus which can be used with the X-Y digitiser tablet shown in FIG. 1;

FIG. 5 is a schematic representation of excitation and processing circuitry used to determine the position of the stylus shown in FIG. 3 relative to the X-Y digitising tablet shown in FIG. 1;

FIG. 6*a* illustrates the form of a time varying excitation signal which is applied to some of the windings shown in FIG. 4;

FIG. 6*b* illustrates a time varying current which flows in a resonator forming part of the stylus shown in FIG. 2, when the excitation signal shown in FIG. 6*a* is applied to one of the windings shown in FIG. 4;

FIG. 6*c* schematically illustrates the form of a signal output from a mixer which forms part of the processing electronics shown in FIG. 5;

FIG. 6*d* schematically illustrates the form of an output voltage from an integrator/sample and hold circuit forming part of the processing electronics shown in FIG. 5;

FIG. 7*a* shows a cross-section of part of the winding shown in FIG. 4*a* and illustrates the relationship between the current flowing in the winding and the resulting magnetic field which is generated;

FIG. 7*b* schematically shows a vector representation of the way in which a Z component of the magnetic field shown in FIG. 7*a* varies along the X direction of the X-Y digitising tablet shown in FIG. 1 and a corresponding approximation of the way in which this vector representation varies with position along the X direction;

FIG. 7*c* schematically shows a vector representation of the way in which an X component of the magnetic field shown in FIG. 7*a* varies along the X direction of the X-Y digitising tablet shown in FIG. 1 and a corresponding approximation of the way in which this vector representation varies with position along the X direction;

FIG. 21 is a perspective view of an electronic chess game employing a X-Y digitising tablet for sensing the locations of the playing pieces which form part of the chess game;

FIG. 22 schematically shows a cross-section of one of the playing pieces of the chess game shown in FIG. 21;

FIG. 28a schematically illustrates a one-dimensional linear position encoder;

FIG. 28b illustrates the form of a first periodic winding forming part of the linear position encoder illustrated in FIG. 28a;

FIG. 28c illustrates the form of a second periodic winding forming part of the position encoder shown in FIG. 28a which has the same period as but is in phase quadrature to the winding shown in 28b;

FIG. 28d illustrates the form a third winding forming part of the position encoder shown in FIG. 28a which has a period different to the period of the windings shown in FIGS. 28b and 28c;

FIG. 28e illustrates the form of a fourth winding forming part of the linear position encoder shown in FIG. 28a which has the same period as but is in phase quadrature to the winding shown in FIG. 28d.

DETAILED DESCRIPTION OF EXEMPLARY EMBODIMENTS

Figure 4A:
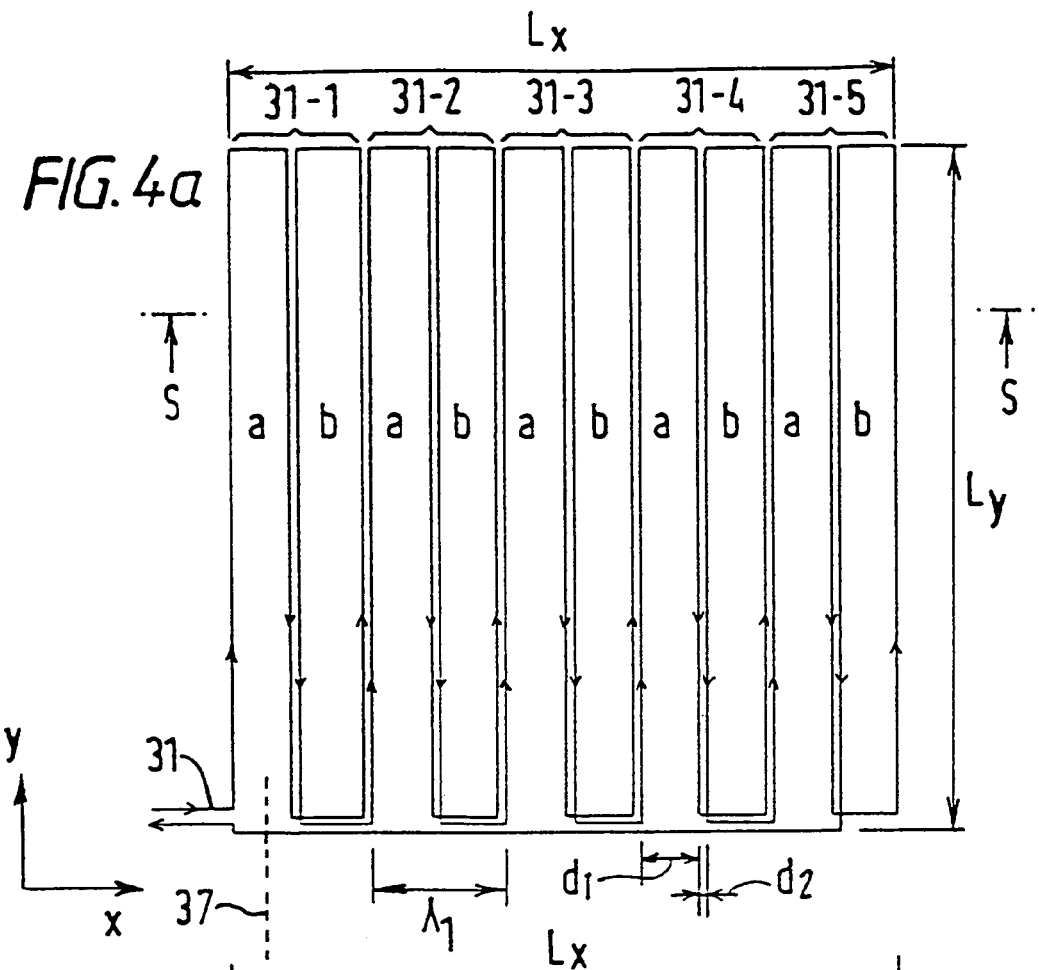
FIG. 4*a* schematically illustrates the form of a first periodic winding having a first period which forms part of a set of windings used for sensing the X position of the stylus relative to the digitising tablet.

FIG. 1 schematically shows a computer system 1 having a display 3, a main processing unit 5, a keyboard 7, an X-Y digitising tablet 9 and a stylus 11. The X-Y digitising system senses the current X-Y position of the stylus 11 over the tablet 9 and uses the sensed position to control the location of a cursor 13 on the display 3. FIG. 2 schematically shows an exploded view of the digitising tablet 9. As shown, the digitising tablet comprises a first group of windings 9-a, a second group of windings 9-b and a base portion 9-c for supporting the two groups of windings 9-a and 9-b. The group of windings 9-a is used for determining the X coordinate position of the stylus 11 and the group of windings 9-b are used for determining the Y coordinate position of the stylus 11.

FIG. 3 shows in more detail the form of the stylus 11 shown in FIG. 1. As shown, the stylus 11 comprises a coil 15 which is connected in series, via a switch 16, to a capacitor 17 to form a resonant circuit, generally indicated by reference numeral 18. The coil 15 is wound around a ferrite core 19 so that the axis 21 of the coil 15 coincides with that of the stylus 11. In this embodiment, the switch 16 closes either when the tip 23 of the stylus 11 is pressed against the top surface of the digitiser tablet 9 or by the activation of a control button (not shown) on the side of the stylus. Therefore, in this embodiment, the stylus 11 is passive in nature since it does not contain a power source such as a battery or the like.

In operation, when the switch 16 is closed and when an energising signal is applied to an energising winding (forming part of the groups of windings 9-a and 9-b), the resonator 18 resonates and induces signals in sensor windings (also forming part of the groups of windings 9-a and 9-b). The arrangement of the excitation winding, the sensor windings and the resonator 18 is such that the signals induced in the sensor windings vary in dependence upon the X-Y position of the resonator 18 relative to the digitising tablet 9. The current X-Y position of the resonator 18 can therefore be determined by suitable processing of the signals induced in the sensor windings. Additionally, the signals induced in the receive windings also vary with the orientation of the stylus 11 and the windings are arranged so that this orientation information can also be determined by suitable processing of the received signals. Further still, in this embodiment, the resonator 18 is in a fixed position relative to the tip 23 of the stylus 11 and therefore, the X-Y position of the tip 23 of the stylus can be determined from the X-Y position of the resonator and the determined orientation.

In this embodiment, four separate windings are used for determining the X position of the stylus 11 and four separate windings are used for determining the Y position. In this embodiment, the four windings used for determining the Y position are the same as those used for the X position but rotated through 90 degrees. A detailed description of the form of the four windings used for determining the X position will now be given with reference to FIGS. 4a to 4d, which illustrate the form of these windings. As shown, each of the windings 31 to 34 extends in the X direction over the entire active length $L_X$ (which in this embodiment is 300 mm) and in the Y direction over the entire active length $L_Y$ (which in this embodiment is 300 mm) of the digitising tablet 9. In this embodiment, the windings are arranged to provide an output signal which sinusoidally varies with the relative position of the stylus and the digitising tablet 9 along the measurement path (the X-axis).

Referring to FIG. 4a, the winding 31 extends in the X direction and comprises a repeating pattern of conductor. More specifically, the winding 31 comprises five periods (31-1 to 31-5) of the repeating pattern, with each period comprising two alternate sense loops (a and b). As shown in FIG. 4a, loops a are formed by winding the wire clockwise and loops b are formed by winding the wire anti-clockwise. Since the five periods of the winding 31 extend over a length of 300 mm, the period or pitch ($\lambda_1$) of winding 31 is 60 mm. As a result of the alternating sense of adjacent loops, the winding 31 is relatively immune to electromagnetic interference (EMI) and does not itself cause EMI in other electrical circuits because the magnetic field generated by a current flowing in the winding falls off approximately 55 dB per pitch from the winding (i.e. every 60 mm). By making the extent of each loop ($d_1$) equal to approximately twice the spacing ($d_2$) between adjacent loops, the output signal varies approximately sinusoidally with the relative position between the stylus and the digitising tablet, with an spatial frequency ($\omega$) equal to $2\pi/\lambda_1$.

Figure 4B:
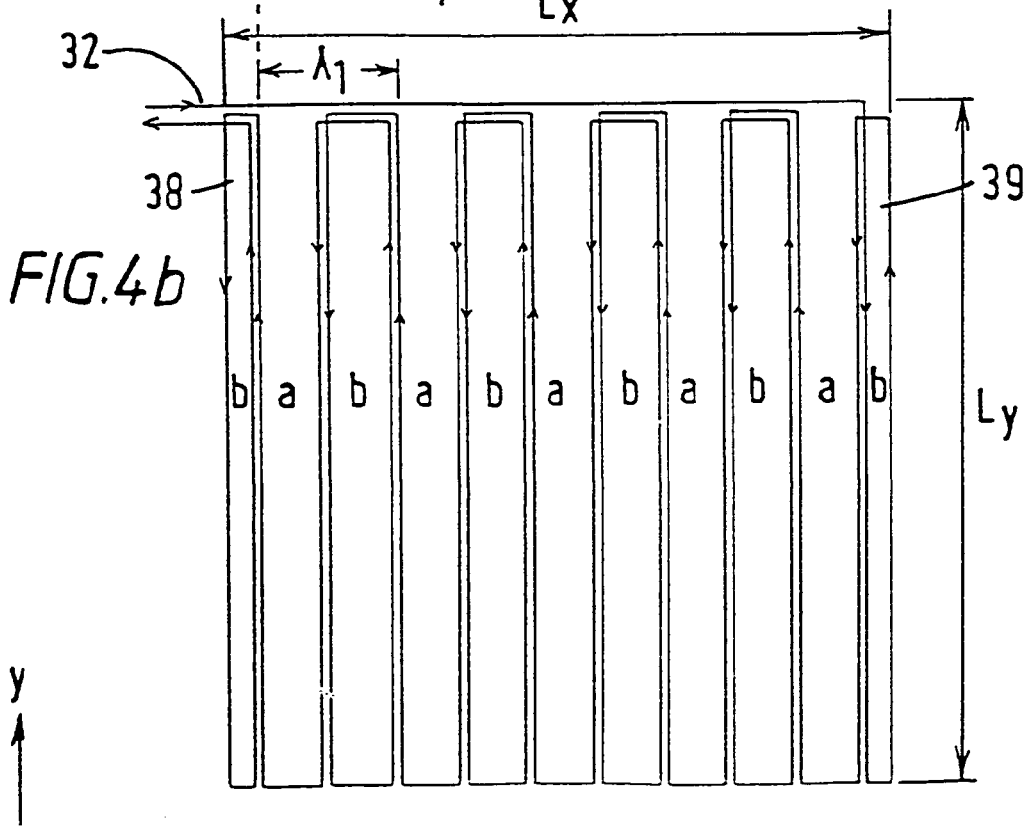
FIG. 4*b* schematically illustrates the form of a second periodic winding having the same period as and being in phase quadrature to the winding shown in FIG. 4*a*, which also forms part of the set of windings used for sensing the X position of the stylus relative to the digitising tablet.

The winding 32 shown in FIG. 4b is also formed by five periods of alternating sense loops a and b and has the same pitch $\lambda_1$ as winding 31. However, as illustrated by the dashed line 37, the loops of winding 32 are shifted along the X direction by $\lambda_1/4$, so that the windings 31 and 32 constitute a phase quadrature pair of windings. In order that both windings 31 and 32 extend over the same length $L_X$, the loops 38 and 39 at the left and right hand end of winding 32 are both wound in the same anti-clockwise direction but extend in the X direction for only a quarter of the pitch $\lambda_1$. This maintains the balance between the number of and the area enclosed by each of the two types of loops a and b. Winding 32 has also been rotated about the X-axis by 180 degrees relative to winding 31, but this does not affect its operation and facilitates the manufacture of the digitising tablet 9.

Figure 4C:
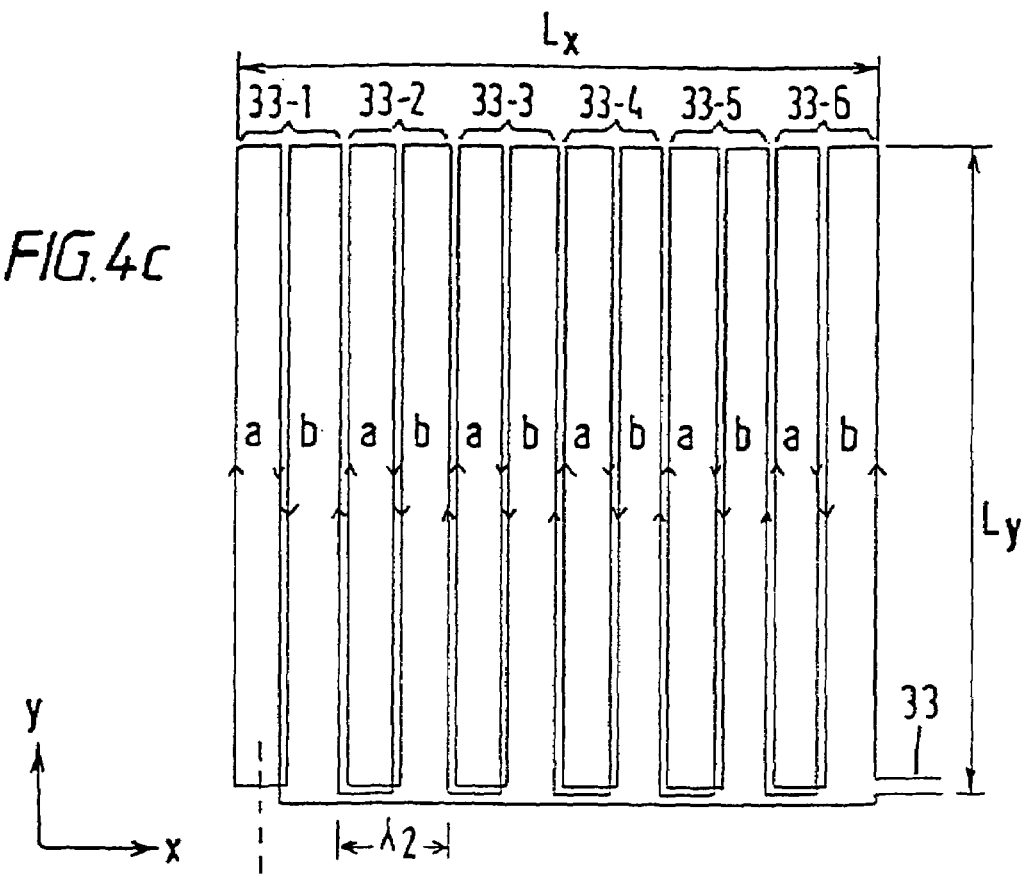
FIG. 4*c* schematically illustrates the form of a third periodic winding having a period which is different from the period of the windings shown in FIGS. 4*a* and 4*b*, and which also forms part of the set of windings used for sensing the X position of the stylus relative to the digitising tablet.

Referring to FIG. 4c, winding 33 has the same general form as winding 31 except that there are six periods (33-1 to 33-6) of the repeating pattern which extend over the active length $L_X$. As with the windings 31 and 32, each period comprises two alternate sense loops a and b. Since there are more periods of the repeating pattern over the active length $L_X$, the pitch $\lambda_2$ of winding 33 is smaller than the pitch $\lambda_1$ of winding 31, and in this embodiment $\lambda_2$ is 50 mm. As shown in FIG. 4c, the output connection from winding 33 is located in the lower right hand corner of the winding. As those skilled in the art will appreciate, the connection point can be made at any position along the length of the winding. The position of the connection point for winding 33 has been chosen in order to separate it from the connection points for windings 31 and 32.

Figure 4D:
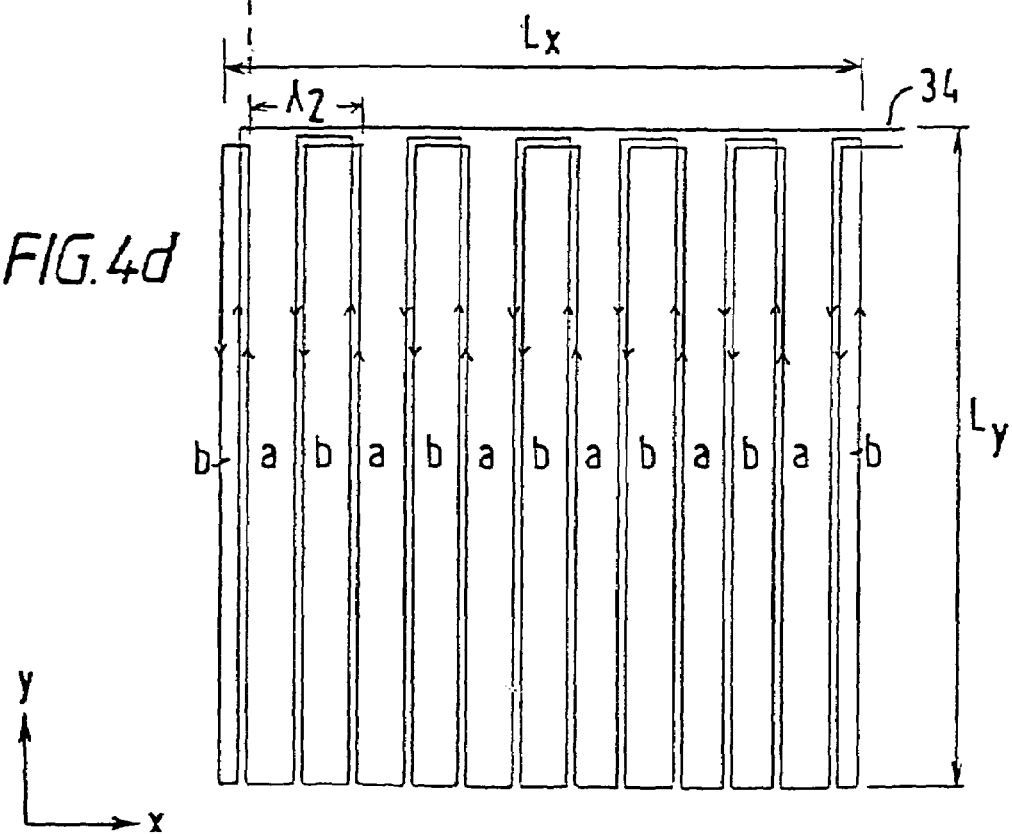
FIG. 4*d* schematically illustrates the form of a fourth periodic winding having the same period as and being in phase quadrature to the winding shown in FIG. 4*c*, which also forms part of the set of windings used for sensing the X position of the stylus relative to the digitising tablet.

As shown in FIG. 4d, winding 34 also comprises six periods of alternating sense loops a and b, but these are shifted by a quarter of the pitch $\lambda_2$ along the X direction relative to those of winding 33. Therefore, like windings 31 and 32, the windings 33 and 34 constitute a phase quadrature pair of windings. Again, winding 34 has been rotated about the X axis by 180 degrees relative to winding 33. This is in order to facilitate the manufacture of the digitising tablet 9 and in order to separate the connection points to the four windings 31 to 34.

In order to form the group of windings 9-a used for determining the X position of the stylus 11, relative to the digitising tablet 9, the windings 31 to 34 are superimposed on top of each other. A similar set of windings rotated by 90 degrees, are provided and superimposed over or under the windings 31 to 34 to form the group of windings 9-b used for determining the Y coordinate of the stylus 11 relative to the digitising tablet 9. Therefore, in this embodiment, the digitising tablet 9 comprises a total of eight separate windings.

In the remaining description, the quadrature pair of windings 31 and 32 will be referred to as the sin A and the cos A windings respectively and the windings 33 and 34 will be referred to as the sin B and the cos B windings respectively. Similarly, the corresponding windings used for determining the Y position will be referred to as the sin C, cos C, sin D and cos D windings.

There are a number of ways that these windings can be manufactured. Most commercial systems to date either employ screen printing technology using conductive inks or printed circuit board (PCB) technology. However, the screen printing technique suffers from the disadvantage that the windings produced have a relatively high resistance as compared with those produced by the PCB technology, resulting either in low output signal levels if the windings are used for sensing magnetic fields, or the necessity of large transmitting powers in order to generate the required strength of magnetic field if the windings are for generating magnetic fields.

Although the windings produced using PCB technology have lower resistance than those produced using screen printed inks, PCB technology suffers from a number of disadvantages, including: (i) existing PCB processing techniques are predominantly batch based with maximum board dimensions of approximately 0.6 m; (ii) existing PCB techniques typically employ multiple layers with through connections (vias) which are difficult to manufacture, especially with multi winding systems such as those used in the present embodiment; and (iii) positional errors are generated in the output signals because the conductors do not lie on a single layer but on two or more separate layers.

Accordingly, in this embodiment, the windings of the digitising tablet 9 are manufactured using wire bonding technology which can alleviate some of these problems. Wire bonding is a relatively well known technique in the art of printed circuit board manufacture. The wire which is used to form the windings typically has a diameter of between 0.1 mm to 0.5 mm and is usually made from enamelled copper so that it can cross other wires in the same layer without short circuiting. A suitable type of wire bonding technology has been developed by, among others, Advanced Interconnection Technology of Islip, Long Island, N.Y., USA. The technique has existed for at least 20 years and the general principle and structure of a suitable wire bonding apparatus is described in, for example, U.S. Pat. No. 4,693,778, the contents of which are incorporated herein by reference.

The applicant's copending International Application No. PCT/GB98/01557 (WO98/54545 filed on 28 May 1998 describes the way in which such a wire bonding technique can be used to manufacture windings for use in position sensors. More specifically, the windings are formed by bonding an enamelled copper wire onto a suitable substrate in the required pattern. In this embodiment, the eight windings of the digitising tablet 9 are formed on a separate substrate which are then superimposed on top of each other to form a multi layered structure. More specifically, in this embodiment, the layered structure is formed by firstly winding the wire onto a wiring loom (not shown) in the required pattern in order to form a first one of the eight windings. This winding is then sandwiched between first and second substrates to trap the wires in place. Another winding is then created using the wiring loom and then sandwiched between the second substrate and a third substrate. This process is then repeated until all eight windings have been sandwiched between two substrates.

Figure 4E:
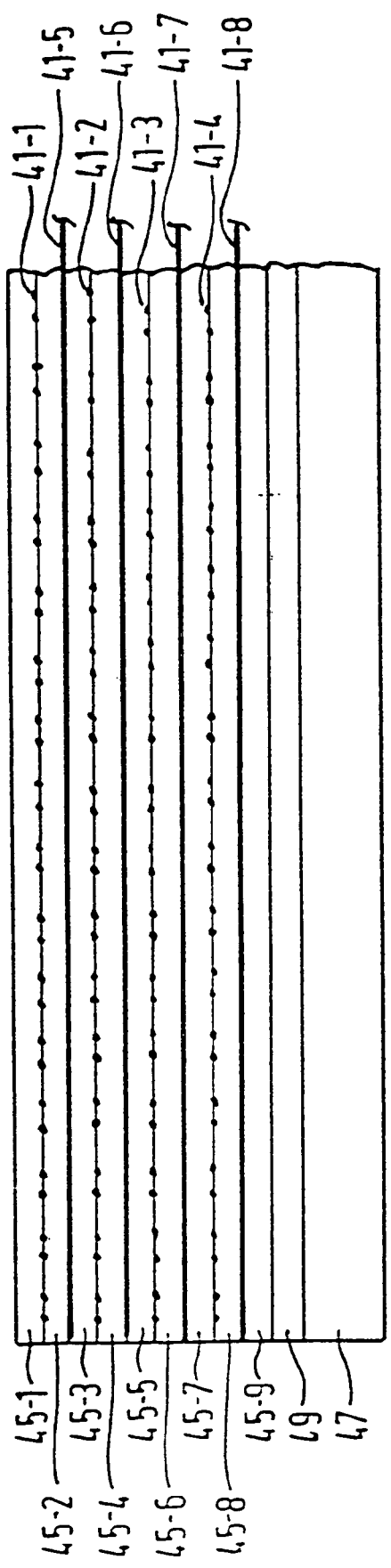
FIG. 4*e* is a cross-sectional view of part of the X-Y digitising tablet shown in FIG. 1.

FIG. 4e shows a cross-sectional view along the X axis of the digitising tablet 9 shown in FIG. 1. As shown, there are nine substrate layers 45-1 to 45-9 which sandwich the eight separate windings 41-1 to 41-8. The top substrate layer 45-1 also acts as a protective layer which may have printed material on the top surface depending on the application for the X-Y digitising tablet. As shown, in this embodiment, the windings for the X position measurement are arranged in alternating layers with those for the Y position measurement. In order to provide mechanical stability, a base layer 47 made from steel is provided. Since the steel base layer 47 may interfere with the magnetic fields produced by currents flowing in the digitiser windings 41, a magnetically soft layer 49 is interposed between the base layer 47 and the last substrate layer 45-9. The magnetically soft layer 47 effectively shields the windings 41 from the steel base layer 47 and enhances the performance by providing a permeable path from magnetic flux to pass behind the windings. The magnetically soft layer may be made, for example, from plastic or rubber containing iron or ferrite powder, although any magnetically soft material may be used. This material may be formed by extrusion in long lengths by, for example, Anchor Magnets Ltd Sheffield UK, under the trade names Ferrostrip and Ferrosheet, and is therefore suited to long length systems. This material is minimally conductive, so that eddy current losses are minimised.G40

The advantages of the wire bonding technology include: (i) the windings have relatively low resistance (with a wire diameter of approximately 0.15 mm, the resistivity is approximately 1 ohm per meter); (ii) a high density of winding can be made—up to 6 wires per mm in two orthogonal directions (with a wire diameter of 0.15 mm), enabling higher complexity windings and increased winding efficiency (because multiple turns can be used); and (iii) multiple layers of wires can be used and wire crossings in the same layer are possible.

A more detailed description will now be given of the way in which the position of the stylus 11 relative to the digitising tablet 9 is determined. In this embodiment, the excitation signal is sequentially applied to the sin A winding twice, then twice to the cos A winding, then twice to the sin C winding and finally twice to the cos C winding. A short period of time is provided between the energisation of each of these windings, during which the signals received on the sin B winding, the cos B winding, the sin D winding and the cos D winding are processed to extract the stylus position relative to the digitising tablet 9. As will be described in more detail below, in this embodiment, in addition to determining the X and Y position of the stylus 11 relative to the digitising tablet 9, the signals received in these windings are processed to determine an estimate of (i) the height (Z) of the stylus 11 above the digitising tablet 9; (ii) the angle ($\alpha$) at which the stylus is tilted from the vertical (i.e. from the Z-axis); and (iii) the orientation ($\theta$) of the stylus 11 in the X-Y plane.

FIG. 5 illustrates the excitation and processing electronics used to energise the excitation windings (sin A, cos A, sin C and cos C) and to detect the signals received from the receive windings (sin B, cos B, sin D and cos D). In this embodiment, the sin A excitation winding is energised first and the signal received on the sin B receive winding is processed. Then the sin A excitation winding is energised again and the signal received on the cos B winding is processed. A similar sequence of excitation and processing is then performed for the excitation windings cos A and the receive windings sin B and cos B and for the excitation windings sin C and cos C and receive windings sin D and cos D. By energising quadrature windings in this manner ensures that the resonator is energised at all positions over the active area of the digitising tablet 9. As shown, the excitation and processing circuitry comprises a digital waveform generator 55 which generates an appropriate excitation signal which is amplified by a MOSFET amplifier 57 and applied to the appropriate excitation winding via switch 59 and a respective output line 50-1 to 50-4. The digital waveform generator 55 is controlled by a microcontroller 61 which ensures that the frequency of the AC energising signal is suitable for causing the resonator 18 in the stylus 11 to resonate. The microcontroller 61 also controls the digital waveform generator and the switch 59 so that the sin A, cos A, sin C and cos C windings are energised at the right time and in the right order.

FIG. 6a, shows the form of the excitation signal which is sequentially applied to the four excitation windings (sin A, cos A, sin C and cos C) in this embodiment. As shown in FIG. 6a, the excitation signal 52 comprises six periods of a square wave voltage whose frequency matches that of the resonant frequency of the resonator 18. In this embodiment, the resonant frequency of the resonator, and hence that of the excitation signal, is 2 MHz, although any frequency in the range of 10 kHz and 10 MHz would be practical. When this excitation signal 52 is applied to one of the excitation windings, a current flows in the excitation winding which creates a magnetic field which couples with the resonator 18 and causes it to resonate. FIG. 6b illustrates the general form of the resonator current 53 as a result of the energisation signal 52 being applied to one of the energising windings. As shown, the resonator current gradually increases in magnitude from the time that the excitation voltage is applied to the excitation winding. The resonator current reaches a maximum value when the excitation voltage is removed from the winding at time $t_1$ and continues to resonate for a short period of time (T) thereafter. As will be explained below, in this embodiment, the processing circuitry is arranged to process the received signals after time $t_2$, ie after the excitation signal has been removed from the excitation winding. This is possible because the resonator continues to "ring" after the excitation has been removed, and has the advantage that it removes any error caused by direct coupling between the excitation and receive windings.

The signals received from the receive windings (sin B, cos B, sin D and cos D) are fed, via a respective input line 62-1 to 62-4 and switch 63, to an amplifier 65 which amplifies the received signals. The signals which are received from the receive windings are essentially an amplitude modulated version of the excitation signal, in which the positional information of the stylus 11 is encoded within the amplitude. The amplified signals are therefore passed to a mixer 67 where they are synchronously demodulated by multiplying them with a signal having the same fundamental frequency as the excitation signal, which is provided by the digital waveform generator 55 via line 69. More details of the relationship between the excitation signal and the signal used to demodulate the received signals can be found in the applicant's earlier International application WO95/31696, the contents of which are incorporated herein by reference.

FIG. 6c, shows the form of the signal 56 output by the mixer 67. As shown, the mixer output signal 56 starts at time $t_2$ just after the excitation signal has been removed and comprises a DC component which contains the positional information together with unwanted high frequency AC components. The AC components are removed from the mixer output signal 56 by integrating the signal over a predetermined number of periods of the excitation signal (since the integral of a sinusoidally varying signal over one or more periods is zero). This integration of the mixer output signal 56 is performed by the integrator/sample and hold circuit 73 and the integration period is controlled by the digital waveform generator 55 via the control line 75. FIG. 6d, illustrates the form of the output signal 58 of the integrator/sample and hold circuit 73. As shown, the output signal 58 increases with time and the final value ($V_{out}$) depends upon the total DC level of the mixer output signal 56 during the integration period. The output signal ($V_{out}$) from the integrator/sample hold circuit 73 is then converted from an analog signal into a digital signal by the analog to digital converter 77 and passed to the microcontroller 61. As mentioned above, the excitation and processing procedure is then repeated for different combinations of excitation and receive windings and the microcontroller 61 uses the output signals ($V_{out}$) from the different combinations to derive the position (X, Y, Z), tilt ($\alpha$) and orientation ($\theta$) of the stylus 11. This information is then passed, via line 79, to the main computing unit 5, shown in FIG. 1, which uses the information to control the position of the cursor 13 and other information displayed on the display 3.

The way in which the X, Y and Z position, the tilt ($\alpha$) and the orientation ($\theta$) of the stylus 11 is determined will now be described. In order to do this, however it is necessary to understand the form of magnetic field created by the energising current flowing in the energising windings sin A, cos A, sin C and cos C and how that magnetic field interacts with the resonator 18 in the stylus 11, to induce a signal in the receive windings sin B, cos B, sin D and cos D, from which this positional and orientation information can be determined. As will be appreciated by those skilled in the art, the magnetic field generated by a current flowing in a winding is a function of the shape of the winding and the excitation signal which is applied to the winding, ie:

$$H^{winding}(x,y,z,t)=f(SHAPE, E(t)) \quad (1)$$

Similarly, the EMF induced in a winding located in an alternating magnetic field is a function of the magnetic field and a function of the shape of the winding, ie:

$$EMF^{winding}(t)=f(SHAPE, H(x,y,z,t)) \quad (2)$$

As mentioned above, in this embodiment, the shape of the digitiser windings shown in FIG. 4 have been designed so that the magnetic field generated by each winding, when energised, varies substantially sinusoidally with position along the winding. The way in which this is achieved will now be illustrated for the sin A winding 31 shown in FIG. 4a, with reference to FIG. 7. FIG. 7a shows a cross-section along the lines S—S of part of the sin A winding 31 shown in FIG. 4a and in particular shows a cross-section through period 31-3 and part of periods 31-2 and 31-4. The Figure shows the situation where a constant current is applied to the sin A winding 31. As can be confirmed by considering the path taken by a current flowing through the sin A winding 31, the current in the pairs of wires located next to each other, eg wires 81 and 82, flow in the same direction, either into the paper or out of the paper and the current flowing in an adjacent pair of wires, such as wires 83 and 84, flow in the opposite direction. This is illustrated in FIG. 7a by using dots to represent currents which come out of the paper and by using crosses to represent currents going into the paper. Therefore, the magnetic field created by each pair of wires can be determined and these are approximated by the circles 85-1 to 85-5. These magnetic fields 85 combine with each other to create a resultant magnetic field which can be split into a component in the Z direction, a component in the X direction and a component in the Y direction. Each of these magnetic field components will now be considered and in particular with regard to how they vary in the X direction.

The Z component will be considered first. At the point A, the magnetic field lines point horizontally to the left in the X direction and therefore there is no Z component at point A. This is represented by the dot 86 in the vector diagram shown in FIG. 7b. However, in moving from point A to point B, the Z component of the magnetic field increases in value to a maximum value at point B. This is represented by the vectors 88 and 90, which increase in size from point A to point B. Continuing this analysis along the X direction, results in the complete vector drawing shown in FIG. 7b. Beneath this vector drawing, there is an approximation of the way in which the magnitude and direction of the vectors change with position along the X direction. As shown, this approximation varies in a sinusoidal manner with the period of the sinusoidal variation matching the pitch $\lambda_1$, of the sin A winding 31. As those skilled in the art will appreciate, the variation of the Z component will not be exactly sinusoidal and as a result, the generated magnetic field will also include unwanted higher order spatial harmonics. However, these higher order harmonics have shorter pitches, and since their amplitudes drop off at a rate that is proportional to their pitch, the magnetic field shape will increasingly become a pure sinusoid with increasing gap between the resonator 18 and the windings. In addition, the winding shapes can be chosen to eliminate the lowest unwanted harmonics, which are the ones that persist over larger gaps. For example, the spacing between the neighbouring pairs of wires in FIG. 7 can be chosen to eliminate the spatial third harmonic. By eliminating these low spatial harmonics, the magnetic field shape very closely approximates to a sinusoid at even small gaps.

A similar analysis on the horizontal X component of the magnetic field results in the vector diagram illustrated in FIG. 7c, which, as shown, also approximates to a sinusoidally varying function with X, having a period equal to the pitch $\lambda_1$ of the sin A winding 31 but which is 90 degrees out of phase with the Z component. A similar analysis can be performed for the variation of the Y component of the magnetic field in the X direction. However, since the wires are parallel to the Y direction, they only produce magnetic field components in the X and Z directions. As a result, the Y component of the magnetic field is essentially zero, except at the ends of the coils in the Y direction, where the wires parallel to the Y direction are joined by wires parallel to the X direction. These latter wires produce magnetic fields with components in the Y direction, but these drop off rapidly with gap between the stylus and the windings.

As those skilled in the art will appreciate, the magnitude of the magnetic field generated by the excitation of the sin A winding decreases with distance from the winding in the Z direction. It can be shown that this fall-off in the magnetic field can be approximated by an exponential function, with the fall off rate being approximately inversely proportional to the pitch $\lambda_1$ of the sin A winding, so that the larger the pitch is the lower the fall-off rate is.

From the above analysis, a "shape factor" for the sin A winding 31 can be defined as follows:

$$S^{sin\,A}(x,y,z)=e^{(-\omega_A z)}[-\cos(\omega_A x+\phi_x), 0, \sin(\omega_A x+\phi_x)] \quad (3)$$

where $\omega_A=2\pi/\lambda_1$ and $\phi_X$ is a system constant whose value depends upon the position of the reference point used as the origin for the (X, Y, Z) position measurements. Since the cos A winding 32 has the same general shape as the sin A winding 31 but shifted by $\lambda_1/4$ in the X direction, a similar shape factor for the cos A winding 32 can be defined as follows:

$$S^{cos\,A}(x,y,z)=e^{(-\omega_A z)}[\sin(\omega_A x+\phi_x), 0, \cos(\omega_A x+\phi_x)] \qquad (4)$$

Similar expressions can be derived for the shape factors for the sin B and cos B windings 33 and 34, noting that the spatial frequency ($\omega$) will be different because the pitch $\lambda_2$ of the sin B and cos B windings is different from that of the sin A and cos A windings 31 and 32. The shape factors for the sin C, cos C, sin D and cos D windings can be obtained through a similar analysis, noting that for these windings, the X component of the magnetic field is essentially zero away from the ends of the wires in the X direction, because the wires away from these ends are all parallel to the X direction.

Consequently, when the excitation signal shown in FIG. 6a is applied to the sin A winding, the following magnetic field is generated around the digitising tablet 9:

$$H^{sin\,A}(x,y,z,t)=S^{sin\,A}(x,y,z) \cdot f(E(t)) \qquad (5)$$

Figure 8:
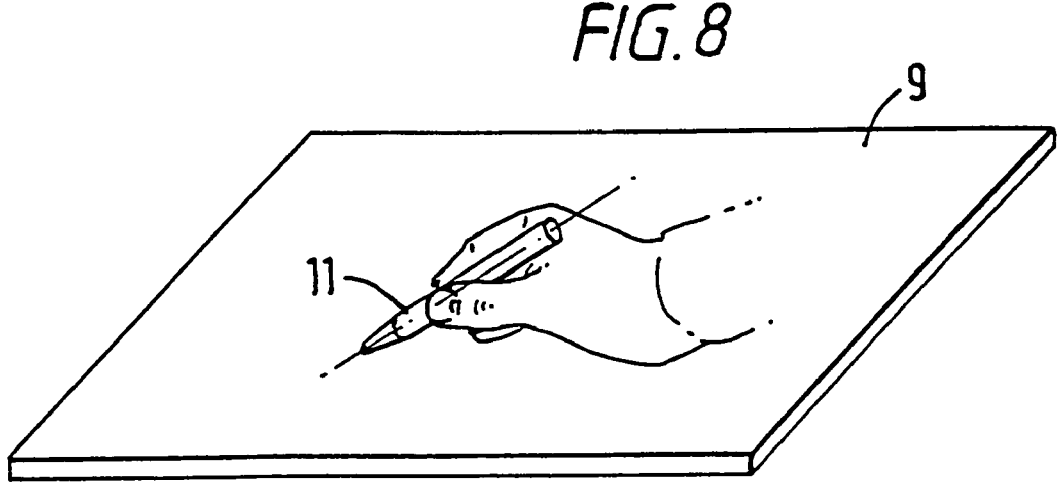
FIG. 8 is a perspective view of an operator's hand holding the stylus shown in FIG. 2, which illustrates the tilt of the stylus longitudinal axis from the vertical direction.

As mentioned above, the excitation signal E(t) is a square wave voltage which comprises a fundamental component, having a frequency which is matched to the resonant frequency of the resonator 18, and higher order harmonics. Since the exact nature of the time variation of the excitation signal is not critical to the following analysis, a more detailed description of the excitation signal will be omitted. The generated magnetic field couples with the resonator 18 and causes it to resonate. The current which is caused to flow in the resonator by the generated magnetic field is proportional to the component of the generated magnetic field along the axis 21 of the resonator 18. During normal use, as illustrated in FIG. 8, the user will usually hold the stylus 11 like a pen, resulting in the axis 21 of the resonator 18 being tilted from the vertical by some unknown angle ($\alpha$).

Figure 9:
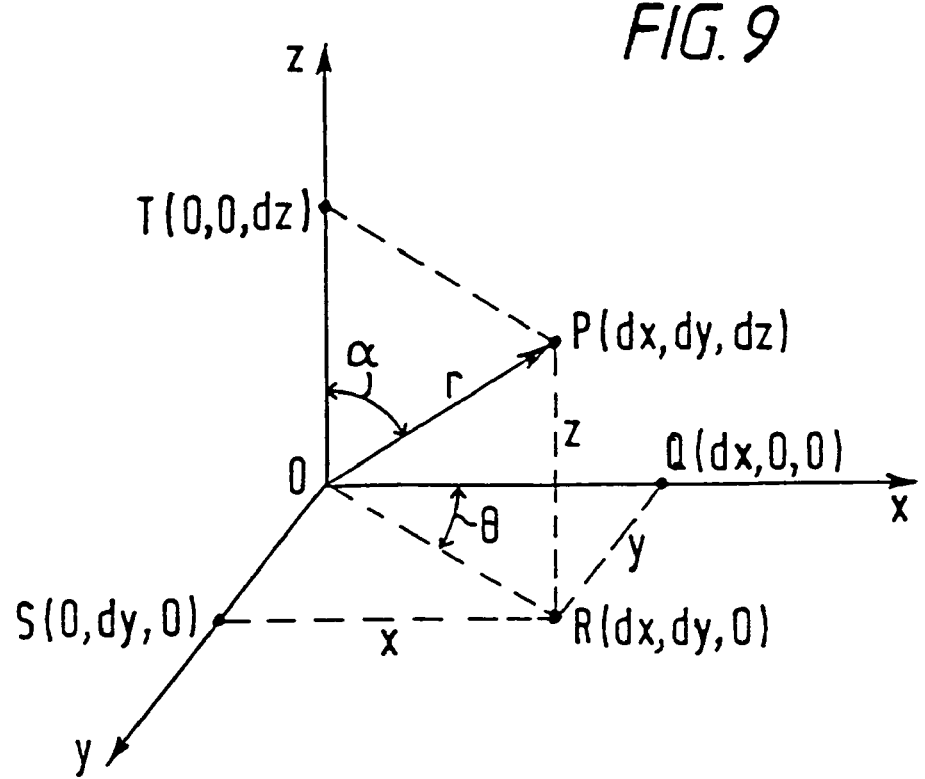
FIG. 9 is a three-dimensional coordinate diagram relating the axis of the stylus to the X, Y and Z coordinate system of the digitising tablet shown in FIG. 1.
Figure 10:
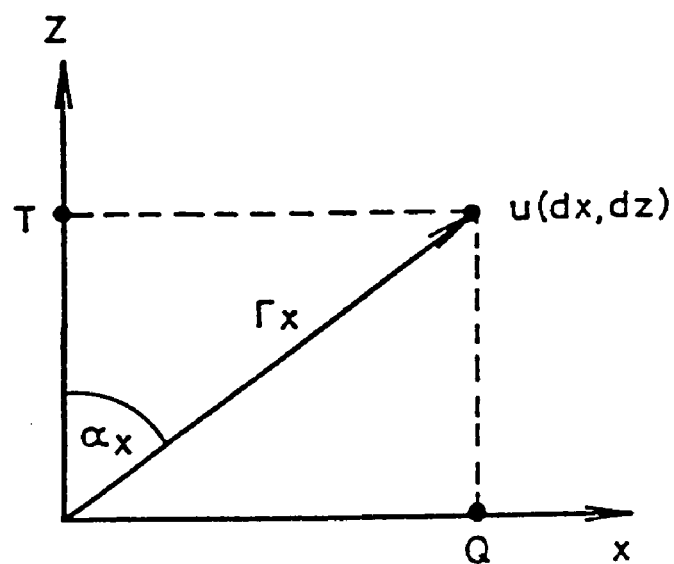
FIG. 10 is a coordinate diagram of the X-Z plane illustrating the projection of the stylus axis shown in FIG. 9 in the X-Z plane.
Figure 11:
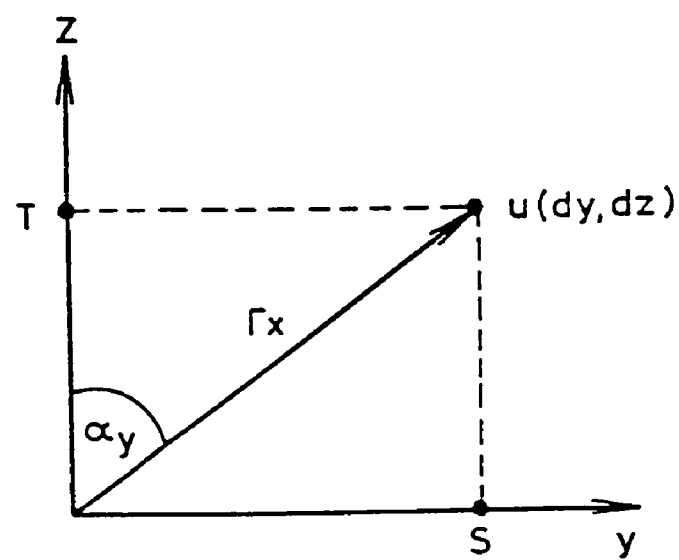
FIG. 11 is a coordinate diagram of the Y-Z plane illustrating the projection of the stylus axis shown in FIG. 9 in the Y-Z plane.

FIG. 9, shows a three dimensional cartesian plot with the origin located at the centre of the resonator and with the axis of the resonator pointing in the direction of the unit vector r (dx, dy, dz). As shown in FIG. 9, the unit vector r is tilted from the vertical by the angle $\alpha$ and rotated through an angle $\theta$ from the X-axis. The angle $\theta$ represents a measure of the orientation of the stylus 11 in the X-Y plane. Therefore, the resonator current can be expressed by:

$$I_{RES}^{sin\,A}=e^{-\omega_A z}[-\cos(\omega_A x+\phi_x)\cdot dx+0\cdot dy+\sin(\omega_A x+\phi_x)\\ dz]\cdot f(E(t)) \qquad (6)$$

where $$dx=r\cos\theta\sin\alpha=r_x\sin\alpha_x \qquad (7)$$

$$dy=r\sin\theta\sin\alpha=r_y\sin\alpha_y \qquad (8)$$

$$dz=r\cos\alpha=r_x\cos\alpha_x=r_y\cos\alpha_y \qquad (9)$$

where, as illustrated in FIGS. 10 and 11, $r_x$ and $r_y$ are the projections of the unit vector r in the X-Y and Y-Z planes respectively and where $\alpha_x$ and $\alpha_y$ are the respective angles between these projected vectors and the Z-axis. This resonator current creates a resonator magnetic field in the direction of the resonator axis 21 which in turn induces an EMF in the sin B and cos B windings 33 and 34. The resonator magnetic field will also induce a signal in the other windings, however, these other signals are not used in the subsequent calculations and will therefore be ignored. As a result of the reciprocal nature of the magnetic coupling between the windings of the digitising tablet 9 and the resonator 18, the EMF induced in the sin B coil will have the following form:

$$EMF_{sin\,B}^{sin\,A}=e^{-\omega_B z}[\sin(\omega_B x+\phi_x)\cdot dx+0\cdot dy+\cos(\omega_B x+\\ \phi_x)\cdot DZ]\cdot f(I_{RES}^{sin\,A}) \qquad (10)$$

which, after being demodulated by the mixer 67 integrated by the integrator/sample and hold circuit 73 and simplified has the following from:

$$S^A S^B = Ar_x^2 e^{-\omega_\Sigma x z}[\sin(\omega_A x+\phi_x-\alpha_x)\cdot\sin(\omega_B x+\phi_x-\alpha_x)] \qquad (11)$$

Where $S_A S^B$ is the output signal $V_{OUT}$ mentioned above when the sin A winding is energised and the signal induced in the Sin B winding is processed, where $\omega_{\Sigma x}=\omega_A+\omega_B$ and where A is a coupling constant known in advance. In a similar manner, the signal induced in the cos B winding by energising the sin A winding will have the following form:

$$S^A C^B = Ar_x^2 e^{-\omega_\Sigma x z}[\sin(\omega_A x+\phi_x-\alpha_x)\cdot\cos(\omega_B x+\phi_x-\alpha_x)] \qquad (12)$$

Similar expressions can also be derived for the signals induced in the sin B and cos B windings when the cos A winding is energised and these are given by:

$$C^A S^B = Ar_x^2 e^{-\omega_\Sigma x z}[\cos(\omega_A x+\phi_x-\alpha_x)\cdot\sin(\omega_B x+\phi_x-\alpha_x)] \qquad (13)$$

$$C^A C^B = Ar_x^2 e^{-\omega_\Sigma x z}[\cos(\omega_A x+\phi_x-\alpha_x)\cdot\cos(\omega_B x+\phi_x-\alpha_x)] \qquad (14)$$

In this embodiment, the signals given in equations 11 to 14 are combined by the microcontroller 61 to form the following sum and difference signals:

$$S_x^\Sigma = S^A C^B + C^A S^B = Ar_x^2 e^{-\omega_\Sigma x z}\sin[\omega_{\Sigma x} x+2\phi_x-2\alpha_x] \qquad (15)$$

$$C_x^\Sigma = C^A C^B - C^A C^B = Ar_x^2 e^{-\omega_\Sigma x z}\cos[\omega_{\Sigma x} x+2\phi_x-2\alpha_x] \qquad (16)$$

$$S_x^\Delta = S^A C^B - C^A S^B = Ar_x^2 e^{-\omega_\Sigma x z}\sin[\omega_{\Delta x} x] \qquad (17)$$

$$C_x^\Delta = C^A C^B + S^A S^B = Ar_x^2 e^{-\omega_\Sigma x z}\cos[\omega_{\Delta x} x] \qquad (18)$$

which are derived using the well known expansions of sin (A±B) and cos (A±B) in terms of sin A, sin B, cos A and cos B. By taking the arc-tangent of the ratio of these components a coarse position measurement phase and a fine position measurement phase of the X coordinate position of the stylus 11 can be determined. More specifically, the coarse position measurement phase is determined by taking the four quadrant inverse tangent of the sin and cos difference signals using the following equation:

$$\arctan 2(S_x^\Delta, C_x^\Delta) = \omega_{\Delta x} x = \frac{2\pi(N_A - N_B)x}{L_x} \qquad (19)$$

and the fine position measurement phase is determined by taking the four quadrant inverse tangent of the ratio of the sin and cos sum signals using the following equation:

$$\arctan 2(S_x^\Sigma, C_x^\Sigma) = \omega_{\Sigma x} x + 2\phi_x - 2\alpha_x = \frac{2\pi(N_A + N_B)x}{L_x} + 2\phi_x - 2\alpha_x \qquad (20)$$

where $N_A$ and $N_B$ are the number of periods of the sin A and the cos B windings respectively over the active length $L_X$ of the digitising tablet 9. As can be seen from equations 19 and 20, the tilt ($\alpha$) of the stylus 11 has introduced a positional error ($2\alpha_x$) into the fine position measurement phase given in equation 20. It does not, however, affect the coarse position measurement phase.

A similar processing of the signals received from the sin D and cos D windings when the sin C and cos C windings are energised results in the following expressions for the coarse and fine position measurement phases of the y position of the stylus 11 relative to the digitising tablet 9:

$$\arctan 2(S_y^\Delta, C_y^\Delta) = \omega_{\Delta y} y = \frac{2\pi\{N_C - N_D\}y}{L_y} \qquad (21)$$

$$\arctan 2(S_y^\Sigma, C_y^\Sigma) = \omega_{\Sigma y} y + 2\phi_y + 2\alpha_y = \frac{2\pi(N_C + N_D)y}{L_y} + 2\phi_x + 2\alpha_x \qquad (22)$$

Figure 12:
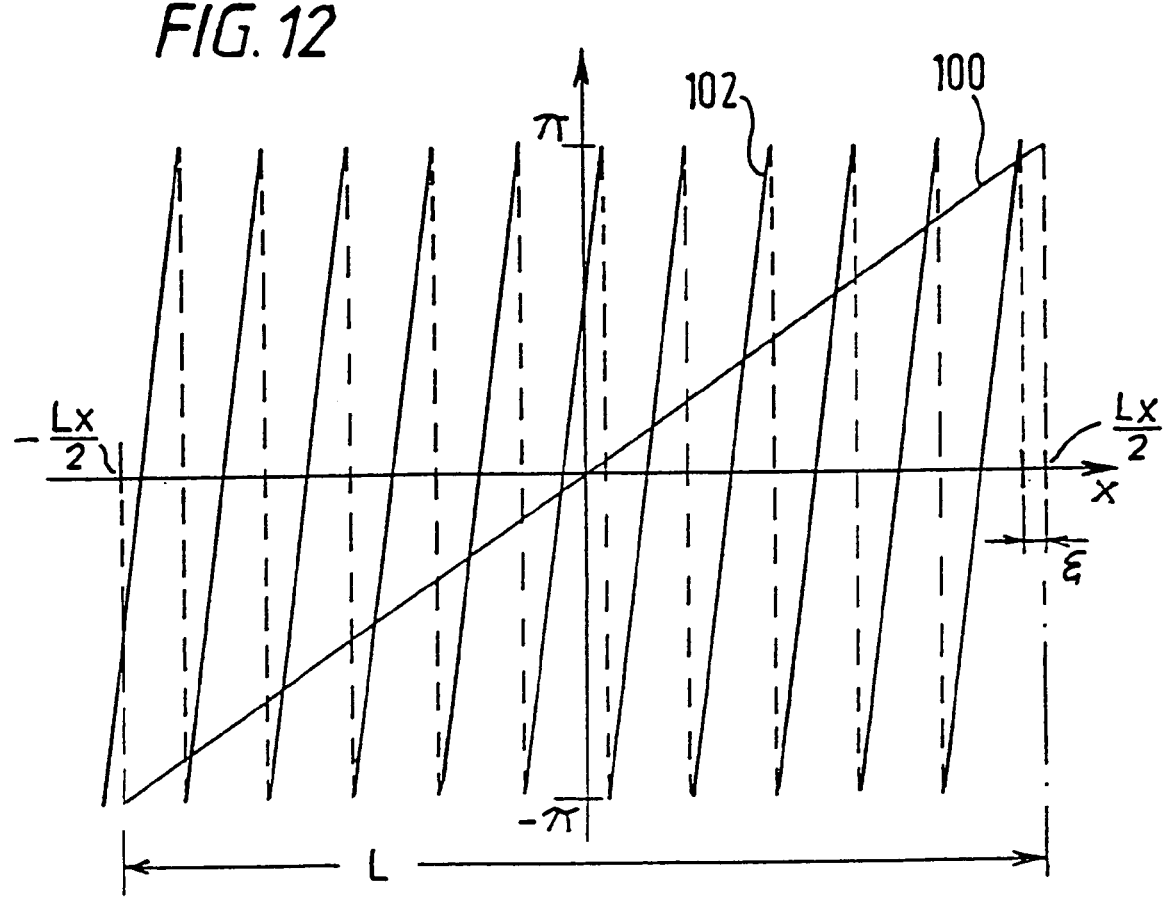
FIG. 12 is a plot illustrating the way in which two output signals, derived by the processing electronics shown in FIG. 5, vary in dependence upon the X position of the stylus relative to the digitising tablet and illustrates the positional error caused by the tilt of the stylus from the vertical direction.

FIG. 12 illustrates the way in which the coarse and fine position measurement phases for the X position vary with the position across the active length $L_X$ of the digitising tablet 9. As shown, the coarse position measurement phase 100 varies linearly between $-\pi$ and $\pi$ across the entire active length $L_X$ of the digitising tablet 9. This measurement therefore gives an unambiguous measure of the X position over the entire length $L_X$. This is because $N_A - N_B = 1$. The fine position measurement phase 102 also varies linearly between $-\pi$ and $\pi$. However, the fine position measurement phase cycles between $-\pi$ and $\pi$ eleven times across the length $L_X$. This is because $N_A + N_B = 11$. Since the fine position measurement phase contains a positional error $\xi$ caused by the tilt of the resonator 18 it is not possible to retrieve the fine position measurement. However, since the coarse position measurement phase is derived from a difference signal, the effect of the tilt on the sensed signals is cancelled out. Therefore, the coarse position measurement can always be used to determine the current position of the stylus 11 relative to the digitising tablet 9, regardless of its tilt.

Figure 13:
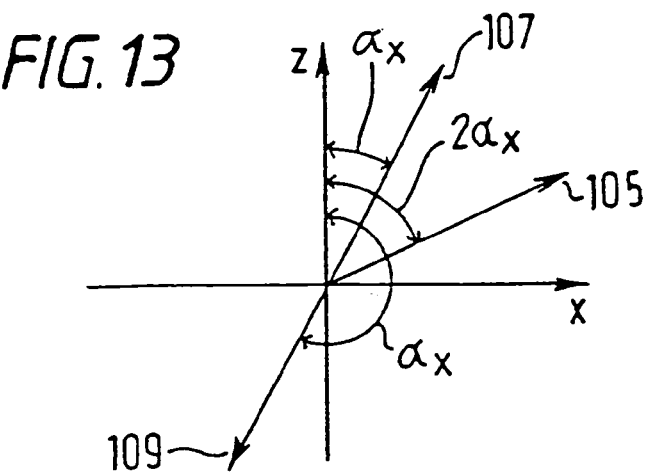
FIG. 13 is a cartesian plot showing the two values which an angle can take if twice the angle is known.

In this embodiment, the coarse position measurements for the X and Y positions, are input into the respective equations 20 and 22 together with the known constants $\phi_x$ and $\phi_y$ to give estimates of $2\alpha_x$ and $2\alpha_y$. Given $2\alpha_x$ and $2\alpha_y$, there are two possible values for $\alpha_x$ and $\alpha_y$ which differ by 180 degrees. This is illustrated in FIG. 13, which shows that the angle $2\alpha_x$ between the Z-axis and the line 105 can be obtained if $\alpha_x$ equals the angle between the Z-axis and the line 107 or the angle between the Z-axis and the line 109. However, if the range of tilt is limited to $-\pi/2$ and $\pi/2$, then an estimate of the value of $\alpha_x$ and $\alpha_y$ can be determined, from which the tilt a of the resonator axis 21 from the Z-axis can be determined together with the orientation $\theta$ of the stylus 11 in the X-Y plane, from the following equations:

$$\alpha = \tan^{-1}[\sqrt{\tan^2\alpha_x + \tan^2\alpha_y}] \qquad (23)$$

$$\theta = \arctan 2[\tan(\alpha_y), \tan(\alpha_x)] \qquad (24)$$

The height Z of the stylus 11 above the digitising tablet 9 can then be obtained from the amplitudes of the combined signals given in equations 15 to 18 and in particular from either of the following two amplitude terms:

$$A_x = A_x^\Sigma = \sqrt{(C_x^\Sigma)^2 + (S_x^\Sigma)^2} = A_x^\Delta = \sqrt{(C_x^\Delta)^2 + (S_x^\Delta)^2} = A r_x^2 e^{-\omega \Delta_x z} \qquad (25)$$

$$A_y = A_y^\Sigma = \sqrt{(C_y^\Sigma)^2 + (S_y^\Sigma)^2} = A_y^\Delta = \sqrt{(C_y^\Delta)^2 + (S_y^\Delta)^2} = A r_y^2 e^{-\omega \Delta_y z} \qquad (26)$$

both of which vary with the height (Z) of the stylus 11 above the digitising tablet 9 and, to some extent, with the tilt and orientation (because of $r_x^2$ and $r_y^2$) of the stylus 11. However, since $\alpha$ and $\theta$ have been estimated from equations 23 and 24, the value of $r_x^2$ and $r_y^2$ can be determined using equations 7 to 9 and hence the height Z of the stylus 11 above the digitising tablet 9 can be determined from these amplitudes.

To summarise, in this embodiment, with an unknown angle of tilt between the stylus and the Z-axis, a coarse position measurement which is unaffected by the tilt has been obtained, from which an estimate of (i) the tilt angle ($\alpha$) and the orientation ($\theta$) of the stylus; and (ii) an estimate of the height of the stylus above the digitising tablet, have been determined. However, a fine position measurement of the stylus's current position has not been obtained because it is corrupted with a positional error caused by the tilt.

Figure 14:
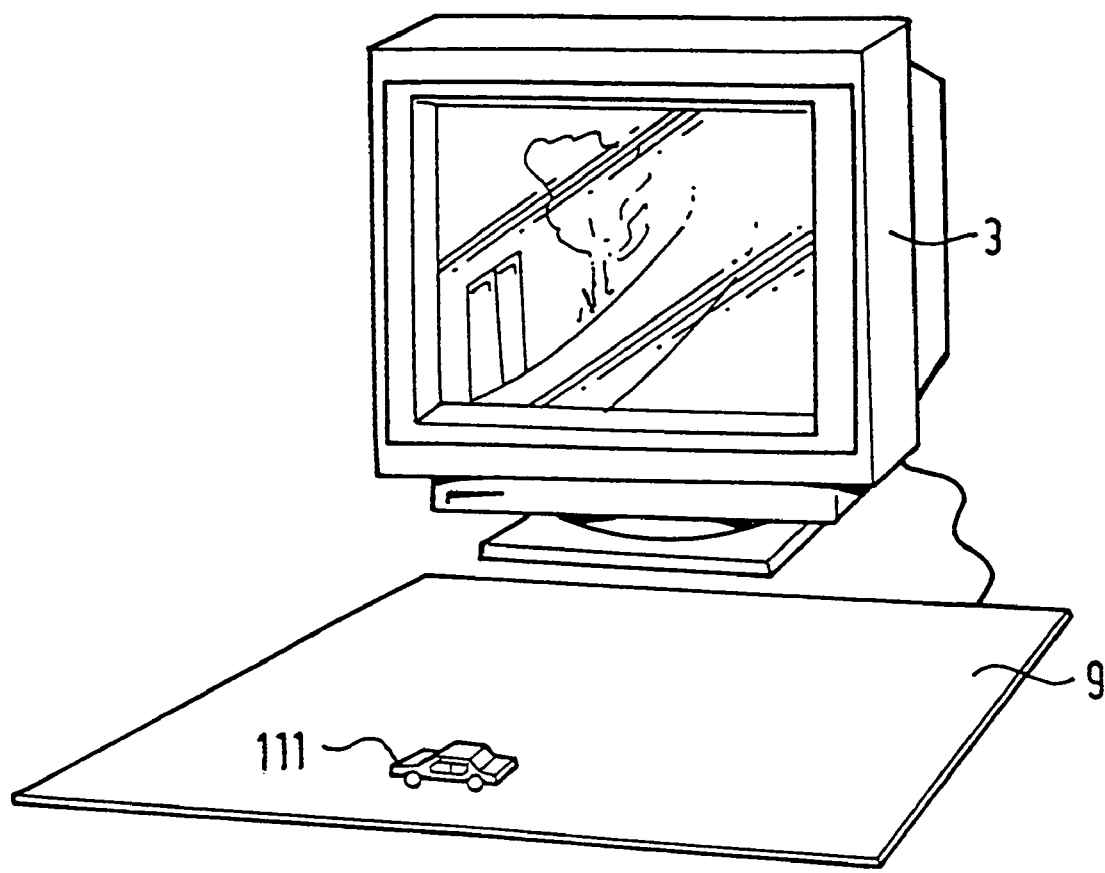
FIG. 14 schematically illustrates the form of an electronic game for a child.
Figure 15:
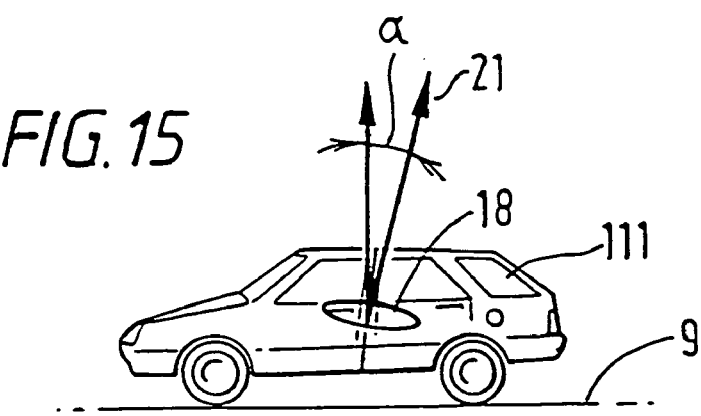
FIG. 15 is a schematic representation of the form of a toy car used in the electronic game shown in FIG. 14, which illustrates the form of resonator used to detect the position of the car relative to an X-Y digitising tablet forming part of the game shown in FIG. 14.

FIG. 14 illustrates the form of a second embodiment in which the angle of tilt of the resonator axis relative to the Z-axis is known. In particular, FIG. 14 schematically illustrates an electronic game having a digitising tablet 9 (which is the same as the one used in the first embodiment), a display 3 and a child's toy 111 which is freely movable over the surface of the digitising tablet 9. As shown in FIG. 15, the toy car 111 houses a resonator 18 whose axis is inclined by a known angle $\alpha$ from the Z-axis. Provided the car is not lifted off the surface of the digitising tablet 9, the angle between the axis 21 of the resonator 18 and the Z-axis will be fixed at the value of $\alpha$. Since the tilt angle $\alpha$ is known in this embodiment, the orientation ($\theta$) of the car 111 in the X-Y plane can be determined from the ratio of the amplitudes defined by equations 25 and 26 (provided that $\omega_{\Delta x}$ equals $\omega_{\Delta y}$), ie from:

$$\frac{A_x}{A_y} = \frac{r_x^2}{r_y^2} = \frac{d_x^2 + d_z^2}{d_y^2 + d_z^2} = \frac{\sin^2\alpha \cos^2\theta + \cos^2\alpha}{\sin^2\alpha \sin^2\theta + \cos^2\alpha} \qquad (27)$$

In particular, the value of $\sin^2\theta$ or $\cos^2\theta$ can be determined since $\alpha$ is known. However, knowing only $\sin^2\theta$ or $\cos^2\theta$ allows for four possible values of $\theta$, one in each quadrant. The best way to determine the correct value of $\theta$ is: (a) to calculate $\alpha_x$ and $\alpha_y$ from equations 23 and 24 for each possible value of $\theta$; then (b) use these values of $\alpha_x$ and $\alpha_y$ to estimate the fine X and Y position of the toy car 111 from equations 20 and 22; and finally (c) identify which value of $\theta$ gives the smallest discrepancy between the estimated fine position and the measured coarse position obtained from equations 19 and 21. The orientation $\theta$ which gives the smallest discrepancy is then used in order to display an appropriate scene which might be viewed from the toy car 111 at its current position and orientation.

It should be noted, however, that the above method is not the most robust way of determining the orientation ($\theta$) of the toy car 111, since errors in the coarse position measurement can affect the way the fine position measurement is interpreted and can result in errors in the choice of the orientation angle $\theta$.

Figure 16:
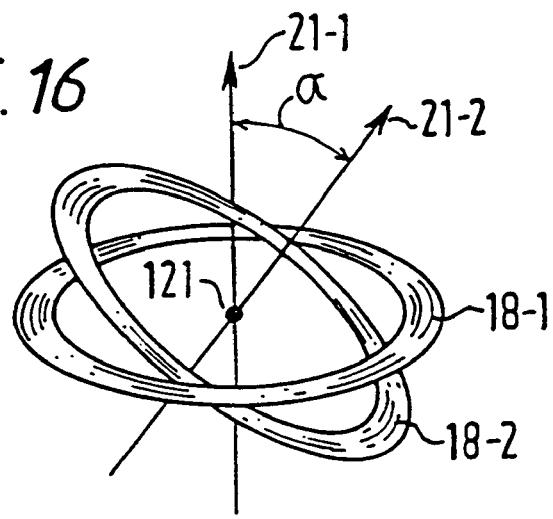
FIG. 16 is a schematic view of the form of a two resonator combination which can be used in the X-Y digitising systems described with reference to FIGS. 1 and 14, which allows accurate position calculations and orientation calculations to be made.

This problem can be overcome by providing two separate but coincident resonators (i.e. having the same centre point) in the toy car 111, each operating at a different frequency so that they can be independently interrogated, with one resonator untilted and the second resonator tilted at some known angle relative to the other. FIG. 16 illustrates such a combination of resonators. As shown, both resonators 18-1 and 18-2 have the same centre point 121 but the axis 21-2 of resonator 18-2 is tilted by a known angle $\alpha$ from the axis 21-1 of the resonator 18-1. In practice the resonator 18-2 can be formed by two series connected coils and a capacitor, with one coil having the same axis as the coil used in the untilted resonator 18-1, and with the other one having its axis orthogonal to the other. When used in the toy car 111 of FIGS. 14 and 15, if the axis 21-1 of resonator 18-1 is arranged to point in the Z direction, then $\alpha_x$ and $\alpha_y$ for resonator 18-1 will be zero. Therefore, both the coarse and the fine position measurement phases, which are obtained by energising the resonator 18-1, can be used to determine the X and Y position of the centre point 121 (and hence of the toy car 111) relative to the digitising tablet 9. Further, since the resonators are coincident, their positions are the same. Consequently, the fine position measurements obtained from the signals from the untilted resonator 18-1, can be used to determine $\alpha_x$ and $\alpha_y$ for the tilted resonator 18-2, using equations 20 and 22. These values of $\alpha_x$ and $\alpha_y$ together with the known angle $\alpha$ and the amplitude measurements defined by equations 25 and 26 can then be used to calculate the orientation $\theta$ of the toy car 111. Therefore, by employing two coincident resonators 18-1 and 18-2, which can be independently interrogated, it is possible to retrieve the fine position measurement and to use these to obtain a more accurate estimate of the orientation of the toy car 111 in the X-Y plane of the digitising tablet 9.

In the above embodiments, a technique has been described for determining the X, Y and Z positions of a resonator or a pair of resonators and for determining the orientation ($\theta$) of the resonator in the X-Y plane, and hence the position and orientation of an object, such as a stylus or a child's toy, which carries the resonator(s). However, in the above embodiments, it has been assumed that the only rotation that the resonator is able to make is in the X-Y plane. However, other rotations of the resonator(s) are possible, for example, about the X-axis, which would lead to a miscalculation of the resonator's position or orientation in the X-Y plane. This is because the system lacks enough information to determine both the fine position and the orientation of the resonators from just the fine phase measurements. In particular, from the four fine phase measurements there are only three independent quantities, because the angle between the two resonator axes is fixed, whereas the determination of the fine position and the orientation requires the determination of five quantities. The only possible source of extra information are the four amplitude measurements, but as mentioned previously, these are not robust quantities and using them to determine the fine position and the orientation would compromise the accuracy of the system. (Note that the coarse position measurements of the two resonators are identical and give only the coarse position of both resonators in the X and Y directions and so these provide no extra information.) Furthermore, the orientation of just two resonators cannot be uniquely determined by the system. This is because the system cannot distinguish between a resonator and the same resonator with its axis reversed, which can be achieved by rotating them through 180 degrees about an axis which is mutually perpendicular to both of their axes. Therefore, in the above embodiments, it is not possible to determine the complete orientation of an object which carries the resonators.

Figure 17:
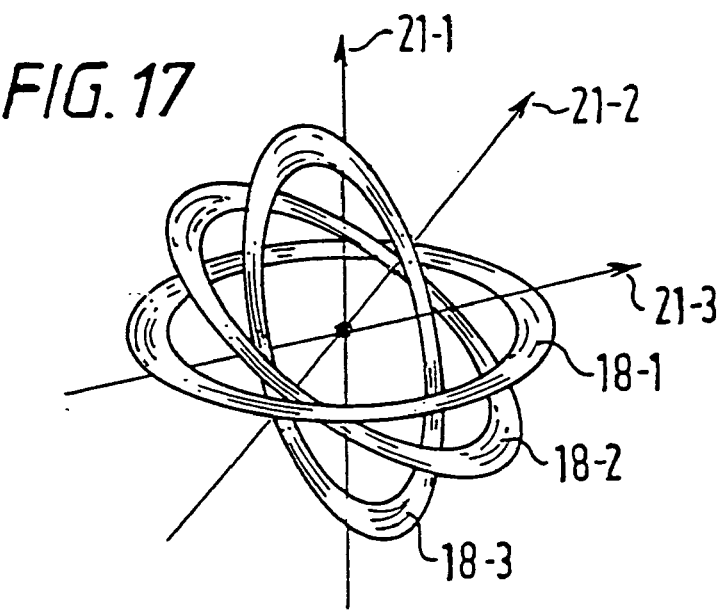
FIG. 17 illustrates the form of a three resonator combination which can be used to provide complete orientation information as well as the X, Y and Z position of an object carrying the resonator combination relative to the X-Y digitising tablet shown in FIG. 1 or 14.

An embodiment will now be described in which the complete orientation of the object which carries the resonators can be determined. In this embodiment, this is achieved by using three coincident resonators, each operating at a different frequency so that they can be independently interrogated and with the axis of each resonator being tilted relative to the other two. A suitable resonator combination is illustrated in FIG. 17. As shown, the resonator combination comprises three resonators 18-1, 18-2 and 18-3, with the respective resonator axes 21-1, 21-2 and 21-3 being tilted relative to each other by some known angles. In order to avoid possible ambiguity with the resonators, there are two configurations that must be avoided. In particular, two of the resonator axes 21-1, 21-2 and 21-3 must not be both perpendicular to the other axis and all three axes must not lie in the same plane, since with these combinations of resonator, there are one or more orientations which cannot be distinguished. For example, if two of the axis are perpendicular to the third, then a rotation through 180 degrees about the third axis reverses the direction of the other two axes and these two orientations cannot be distinguished. Similarly, if all three axis lie in the same plane, then a 180 degree rotation about the line which is perpendicular to that plane and which passes through the centre of the resonators, reverses all three axes and again these two orientations cannot be distinguished.

As described above, each resonator 18 produces a coarse position measurement in the X and Y directions (defined by equations 19 and 21), a fine position measurement of the X and Y directions (defined by equations 20 and 22) and two amplitude measurements (defined by equations 25 and 26). Since the coarse position measurement only depends on the X and Y coordinates of the resonator and since all three resonators are coincident, all three resonators 18-1, 18-2 and 18-3 will therefore give the same coarse position measurement. The amplitude measurements depend mostly on Z, and to some extent on the orientation of the resonator axis with respect to the Z-axis. However, this is not a robust source of information for the resonator orientation, and so in this embodiment, the amplitudes from the three resonators are used just to give information about the height (Z) of the resonators above the digitising tablet 9. The fine position measurement of the X and Y position of the resonator combination still has to be determined together with three parameters defining the complete orientation of the resonator combination one technique for determining these measurements will now be described.

If the tilt angles of the three resonators 18-1, 18-2 and 18-3 are $\alpha_x$ and $\alpha_y$, $\beta_x$ and $\beta_y$, $\gamma_x$ and $\gamma_y$, respectively, then given estimates for X and Y (provided by the coarse position measurements defined by equations 19 and 21) estimates for $2\alpha_x$ and $2\alpha_y$, $2\beta_x$ and $2\beta_y$, $2\gamma_x$ and $2\gamma_y$ can be calculated from the fine position measurements. If the axis of one of the resonators 18 is in the direction of the unit vector u (dx, dy,dz), then:

$$dx = dz \tan \alpha_x$$

$$dy = dz \tan \alpha_y \qquad (28)$$

and since u is a unit vector, $dx^2+dy^2+dz^2=1$, the unit vector u can therefore be defined as follows:

$$u = \pm \frac{\left(\frac{\sin 2\alpha_x}{\cos 2\alpha_x + 1}, \frac{\sin 2\alpha_y}{\cos 2\alpha_y + 1}, 1\right)}{\sqrt{\left[\frac{\sin 2\alpha_x}{\cos 2\alpha_x + 1}\right]^2 + \left[\frac{\sin 2\alpha_y}{\cos 2\alpha_y + 1}\right]^2 + 1}} \qquad (29)$$

Therefore, given estimates for the values of X and Y (from the coarse position measurements), the unit vectors (u, v and w) for the three resonator axes 21-1, 21-2, and 21-3 can be calculated. Since there are two possible directions for each of u, V and w, this results in eight possible combinations of angles between the resonator axes and in order to determine the correct combination, these must be compared with the actual angles between the resonator axes which are known in advance. This can be done using a standard minimisation algorithm. For example, if a, b and c are the unit vectors in the direction of the axes of the unrotated resonator combination, then the quantity:

$$\chi^2 = (u \cdot v - a \cdot b)^2 + (v \cdot w - b \cdot c)^2 + (w \cdot u - c \cdot a)^2 \qquad (30)$$

can be calculated for each of the eight possible combinations of u, v and w, and the estimates for X and Y can be varied to minimise $\chi^2$. The values of X and Y which minimise $\chi^2$ are the best estimates for the resonator position, and the choice of u, v and w which gives this minimum value specifies the orientation of the resonator combination. Although it may not be apparent from equation 30, the use of a resonator triplet which does not form one of the two ambiguous configurations discussed above, guarantees that $\chi^2$ will be minimised for only one choice of u, v and w. It is possible that there will be values of X and Y other than the resonator coordinates for which $\chi^2$ reaches a local minimum, but starting the minimisation algorithm with estimates of X and Y derived from the coarse position measurements ensures that these local minima are avoided.

Figure 18:
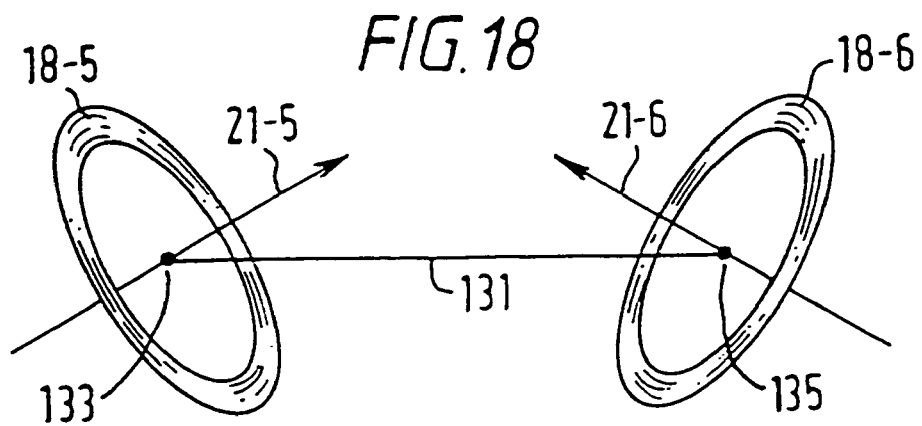
FIG. 18 schematically illustrates the form of a two resonator design which can be used to provide complete orientation information as well as the X, Y and Z position of an object carrying the resonator combination relative to the X-Y digitising tablet shown in FIG. 1 or 14.

An alternative resonator combination which can provide complete orientation information of the resonator combination is illustrated in FIG. 18. As shown, this resonator combination comprises a pair of resonators separated by a fixed (known) distance. In this case, for the orientation of the combination to be unambiguous, the axes 21-5 and 21-6 of the two resonators 18-5 and 18-6 must not be parallel or perpendicular to the line 131 joining their centre points 133 and 135. If this condition is not met, then there is a rotation about the line 131 which preserves or reverses both axes, and these two orientations cannot be distinguished. Additionally, the signals generated in the sensor windings from each of the two resonators 18-5 and 18-6 must be distinguishable from each other. This is most easily achieved by using resonators having different resonant frequencies.

As with the resonator triplet discussed with reference to FIG. 17, the coarse X and Y position of the combination can be calculated from the coarse position measurement from either resonator (or as an average of their coarse X and Y positions) using equations 19 and 20. Similarly, the Z position of the resonator combination can be calculated from the amplitude measurements from either resonator (or again from an appropriate average of the amplitudes of the signals from the two resonators). This leaves the measurement of the fine X and Y position and the orientation of the combination to be determined. In order to do this, more information must be extracted from the coarse position measurements. For example, since the coarse position measurements indicate the X and Y positions of the two resonators 18-5 and 18-6, the difference between the coarse positions will therefore indicate the direction of the line 131 in the X-Y plane, ie the orientation θ of the resonator combination. Further, since the distance between the centres 133 and 135 of the resonators 18-5 and 18-6 is known, there are only two possible directions for the line 131, depending upon which resonator 18-5 or 18-6 is higher. Therefore, comparing the amplitude values from the two resonators determines which resonator is higher, and therefore determines the direction of the line 131. This therefore defines the overall orientation of the resonator combination, except for the rotation about the line 131. As in the case of the resonator triplet, this last rotation and the fine position measurement of the X and Y position can be determined using a standard minimisation technique.

As will be apparent to those skilled in the art, the use of a two resonator combination is advantageous over a resonator triplet combination in a system in which a plurality of different objects are to be tracked relative to the digitising tablet and especially if the operating frequency bandwidth is limited. However, this two resonator embodiment suffers from the problem that the derivation of the fine position parameters involve the use of coarse position measurements and amplitude measurements, which may compromise the overall accuracy of the system.

A number of modifications which can be made to the above digitising systems will now be described together with a number of alternative applications.

Figure 19:
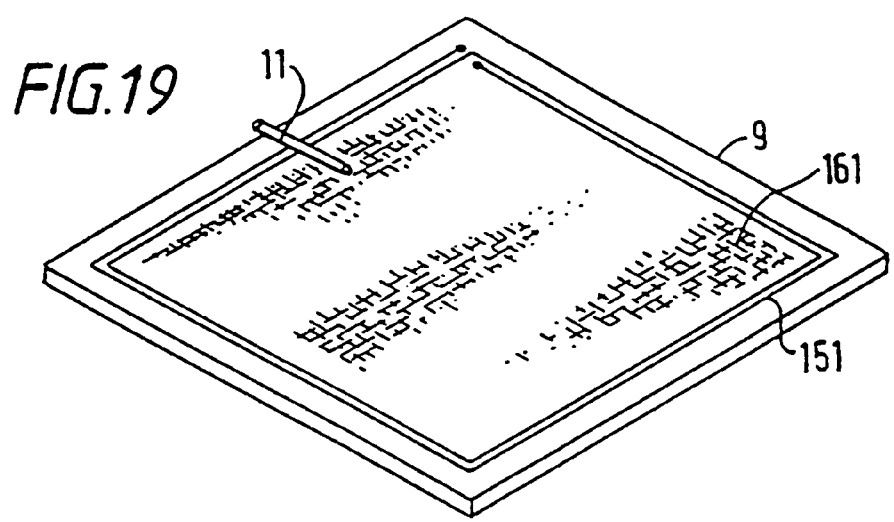
FIG. 19 schematically illustrates the form of a digitising tablet having a periphery mounted excitation winding wound around a set of receive windings.

In the above embodiments, periodic windings having a first period were used to excite the resonator and periodic windings having a second different period were used to receive the signal generated by the resonator. FIG. 19 schematically illustrates the form of a digitising tablet 9 which comprises the same windings (generally indicated by reference numeral 161) as the digitising tablets of FIGS. 1 and 14, together with a separate excitation winding 151 mounted around the periphery of the windings 161. As shown, in this embodiment, the excitation winding 151 is wound two times around the other windings 161.

The general operation of this embodiment is similar to the above embodiments. In particular, in this embodiment, an excitation signal is applied to the winding 151 which energises a resonator located within the stylus 11 and causes it to resonate, which in turn induces signals in each of the windings 161. In this embodiment, the signals induced in all of the eight windings are used. It can be shown that, after demodulation, the signals induced in the four windings used for determining the X position (i.e. the sin A, cos A, sin B and cos B windings) have the following form:

$$S^A = A_0 e^{-\omega_A z} r_x \sin(\omega_A x + \phi_x - \alpha_x) \qquad (31)$$

$$C^A = A_0 e^{-\omega_A z} r_x \cos(\omega_A x + \phi_x - \alpha_x) \qquad (32)$$

$$S^B = A_0 e^{-\omega_B z} r_x \sin(\omega_B x + \phi_x - \alpha_x) \qquad (33)$$

$$C^B = A_0 e^{-\omega_B z} r_x \cos(\omega_B x + \phi_x - \alpha_x) \qquad (34)$$

Where $A_0$ is a coupling factor between the transmit winding 151 and the resonator. Taking the arc-tangent of the ratio of these signals provides a measurement of $\omega_A x + \phi_x - \alpha_x$ and $\omega_B x + \phi_x - \alpha_x$. Similar measurements are also provided by the sin C, cos C, sin D and cos D windings for use in determining the Y position. Taking the sum and difference of the arc-tangents for each of the X and Y direction signals yields the coarse position measurements and the fine position measurements defined by equations 19 to 22, as before. The X and Y position and the orientation of the resonator can therefore be derived in the same manner as before. However, in this embodiment, the overall amplitude of the signals induced in the eight receive windings depends on the coupling factor $A_0$ between the transmit winding 151 and the resonator, which is a function of the position and orientation of the resonator. However, since the orientation and the X and Y position of the resonator has been calculated, these can be combined with the amplitude values and the known field pattern from the peripheral transmit winding 151 to determine the height (Z) of the resonator above the digitising tablet 11. For a simple transmit winding such as the one shown in FIG. 19, the generated magnetic field pattern produced by energising the transmit winding is essentially uniform over the operating region, so that $A_0$ only depends on the orientation of the resonator, thereby simplifying the determination of Z.

Figure 20A:
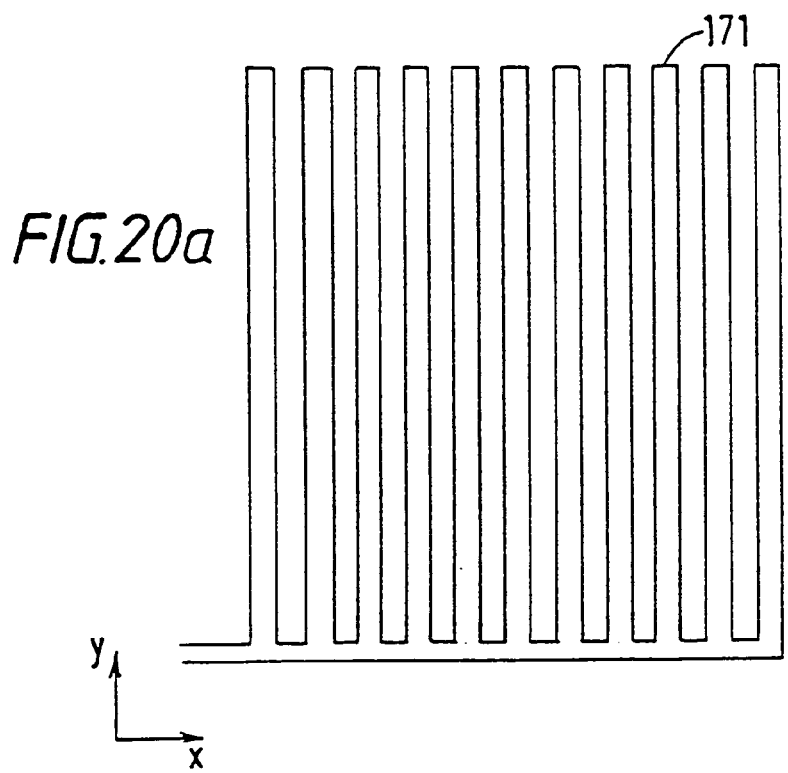
FIG. 20a schematically illustrates the form of a winding which, when energised, will produce a magnetic field which sinusoidally varies along its length and which can be used in a digitising tablet to sense position.
Figure 20B:
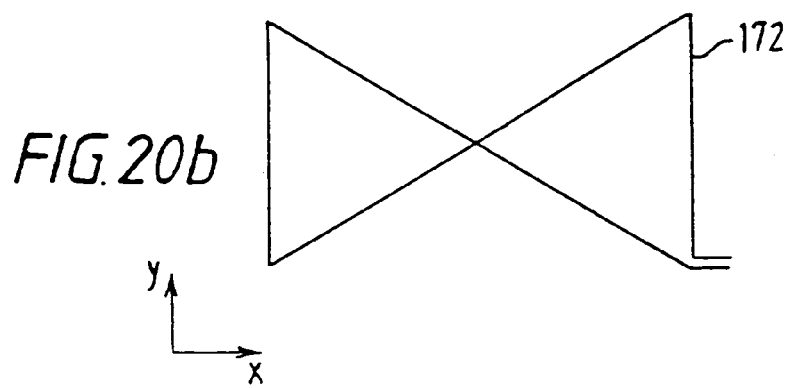
FIG. 20b schematically illustrates the form of a winding which, when energised, will produce a magnetic field which linearly varies along its length and which can be used in a digitising tablet to sense position.

In the above embodiments, the windings used to sense the signal generated by the energised resonator comprise a plurality of alternating sense conductive loops. As discussed above, this type of winding is advantageous because it is relatively immune to electromagnetic interference and does not itself cause much interference to other electronic circuits. However, the use of such windings is not essential. What is important is that the winding generates a magnetic field which varies in a predetermined manner, preferably sinusoidally. FIG. 20a illustrates the form of an alternative winding which can be used. The periodic winding 171 comprises ten periods of alternating convolutions. By considering the magnetic field generated by a current flowing in the winding 171, it can be shown that both the Z and X component of the magnetic field generated by this winding, when energised, varies sinusoidally in a similar manner to the magnetic field generated by the windings shown in FIG. 4. Therefore, this winding may be used in place of one of the windings shown in FIG. 4, but is more likely to form one of a set of similar windings. However, the use of winding 171 is not preferred because background electromagnetic interference will couple into the winding and will produce errors in the output signals. FIG. 20b illustrates the form of another alternative winding 172 which can be used. As shown winding 172 is formed from generally triangular shaped loops which narrow in from their ends towards the central cross-over point. The shape of this winding is arranged so that the output signal varies approximately linearly in the measurement direction (i.e. in the X direction) with the position and orientation of the stylus. By considering the output signals from this winding and the output from, for example, another similar winding having a different rate of narrowing of the loops, the position and orientation can be determined. In order to be able to determine the orientation of the stylus in this embodiment, another similar winding would be required having for example, a different taper so that the signals from each vary in a different linear manner.

In the above embodiments, one or more resonators were provided in the stylus or the toy car. The resonators used comprised an inductor coil and a capacitor. Other forms of resonator can be used, such as magnetostrictive resonators, ceramic resonators or any combination of these. The use of resonators is preferred in most applications because the stylus and the toy car can be passive and the output signals generated by resonators are much larger than those generated by, for example, conductive screens or short circuit coils. Additionally, resonators allow the use of a pulse-echo interrogation technique, like the one described above which reduces interference caused by the direct coupling between the excitation winding and the receive windings. However, even if the signals on the receive windings are processed at the same time as the excitation winding is excited, the signal from the resonator can be distinguished from the signal from the excitation winding because they are 90 degrees out of phase. The same is not the case with a conductive screen or a short circuit coil. However, a system using conductive screens or short circuit coils could, in theory, be used. However, in such embodiments, it may be difficult to derive the full orientation information, since it is difficult to design different short circuit coil combinations and conductive screen combinations which will produce distinguishable signals from each.

An alternative possibility instead of a resonator is the use of one or more powered coils. The coils can be powered by a battery located within, for example, the stylus. In such an embodiment, the stylus would also comprise a local oscillator for generating a drive signal for application to the coil. Where more than one coil is provided, a waveform generator would be required for generating the different driving signals for the different coils, so that the signals induced in the digitising tablet windings from the different coils can be distinguished.

In the above embodiments, a single object was provided which was moveable relative to the digitising tablet. FIG. 21 is a perspective view of an electronic chess game 175 embodying the present invention. The electronic chess game comprises a digitising tablet 9 (which is the same as the digitising tablet used in the embodiment described with reference to FIG. 1) which is used to sense the position and orientation of the playing pieces 177 located on the chess board. In order to differentiate between the signals from each of the different playing pieces 177, each piece 177 carries a resonator having a different resonant frequency. Since there are 32 pieces in a chess game, this involves the use of 32 different resonant frequencies. If the bandwidth available is limited, then the resonators used may comprise a ceramic resonator in series with the coil and capacitor in order to improve the frequency discrimination between the signals from the different resonators. In this embodiment, the processing electronics must energise and process the signals from each playing piece. This is preferably performed sequentially, but can be performed simultaneously if multiple processing channels are used.

In order to sequentially apply an appropriate energising signal to the excitation windings, a digital waveform generator which can be tuned to all the resonant frequencies of interest is required. Continuous control of tuning around these frequencies of interest is desirable to enable the computer control system (not shown) to be able to optimise frequency and hence signal levels, even in the case of poorly tuned resonators. This enables untuned (cheap) resonators having high Q factors to be used. In order to maximise signal levels, the computer can vary the frequency of the energisation signal in order to gain maximum signal levels. It may also detect both the in-phase and the quadrature phase return signals from the resonator in order to detect the return phase of the signal and align the phase with the optimum value. This control of the phase, frequency and amplitude of the excitation signals can be achieved, for example, by using a field programmable logic cell array.

The limit on the number of playing pieces which can be tracked is determined purely on the availability of different resonator frequency values, given the Q of the resonators and appropriate spacing between these frequencies to avoid crosstalk between tracked resonators. In practice, resonators can easily be obtained with 100 kHz increments from 100 kHz to 10 MHz, resulting in the potential to have upto 100 uniquely trackable resonators—the Q's being such that +/−10 kHz would be enough isolation between channels. In this embodiment, it takes approximately 4 ms to determine the position of a playing piece. Therefore, it will take 128 ms to determine the current position of all 32 pieces of the chess game, thus allowing the dynamic tracking of the pieces.

FIG. 22 schematically illustrates the cross-section of one of the playing pieces 177 of the chess game. As shown, in this embodiment, a resonator 18-7 having an axis perpendicular to the base 178 is provided. This ensure that when the piece is located on the board game, the axis 21-7 of the resonator points in the Z-direction. In an alternative game, such as a football game, where the orientation of each playing piece is relevant to the game, each playing piece 177 may carry a resonator combination comprising two or more resonators, such as those shown in FIGS. 17 or 18, from which the complete orientation of the piece can be determined in addition to its current position relative to the digitising tablet using the techniques described above.

As those skilled in the art will appreciate, some embodiments of the present invention can be used in a virtual reality system, for example to track the movements of a 6D joystick. Typically such systems use AC magnetic coupling to track the position of objects. The digitising tablet system described above can be used to mimic this function at lower cost and with a more convenient planar, set of receive windings. However, since this type of embodiment must be able to operate with relatively large distances between the joystick and the digitiser tablet, and since accuracy is not a key feature, windings having a single period over the measurement area are preferably used (since the fall-off of the magnetic field is inversely proportional to the pitch of the windings). In such an application, instead of the two or three resonator design illustrated in FIGS. 17 and 18, three resonators having different resonant frequencies can be used which are placed in different positions on the joystick. The twist of the joystick perpendicular to the digitising tablet can then be calculated from the relative positions of the three resonators and the pitch and yaw of the joystick can be calculated from the relative heights of the resonators above the digitising tablet. Calibration for zero pitch and yaw may be performed by holding the joystick vertical. In such an application, the joystick is preferably powered either by a battery or by direct connection to the processing electronics, since this increases the achievable range, limits the electromagnetic emission and enables accurate gap, pitch and yaw calculations based on signal levels alone without recourse to ratios.

A further application for this type of position encoder is to provide a position feedback measurement in a magnetic levitation system. In such an application, balanced windings of the form shown in FIG. 4 would be essential since such levitation systems use large AC and DC magnetic fields which would interfere with the windings if they are not balanced, ie if they do not comprise an equal number of alternate sense loops. In order to speed up the electronic processing in this embodiment (and in any of the other embodiments), the signals from each of the sensor coils (sin B, cos B, sin D and cos D) could be detected simultaneously with their own processing channel, rather than using the time-multiplexed approach illustrated in FIG. 5. However, this increases the complexity and cost of the processing electronics and is only favoured where it is essential to obtain the position measurements quickly.

Figure 23:
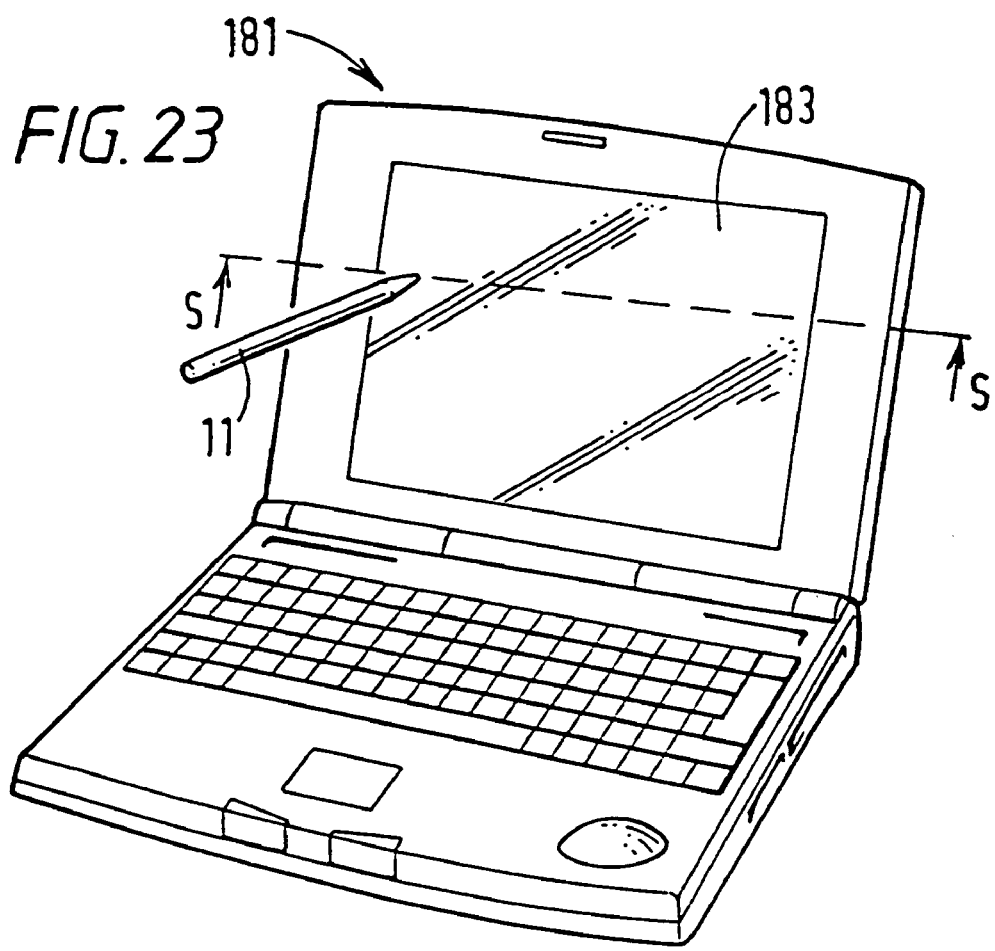
FIG. 23 is perspective view of a personal computer having a X-Y digitising system located behind its liquid crystal display.

FIG. 23 illustrates a further application of the X-Y digitising system embodying the present invention. In particular, FIG. 23 is a perspective view of a personal computer 181 which has, embedded behind the liquid crystal display 183 thereof, a set of windings for determining the X and Y position of a stylus 11 relative to the LCD display 183. In this embodiment, balanced windings are used because they are relatively immune to electromagnetic interference and because they cause little interference to other circuits, and can therefore, be located behind the liquid crystal display, without affecting its operation. Existing display systems which have a touch screen ability use fine coils printed onto the surface of the display. These have a high resistance and therefore suffer from the same problem as screen printed inks. The printed coils also reduce the transparency of the screen. In contrast, the digitiser windings have a relatively low resistance and can be placed behind the liquid crystal display.

Figure 24:
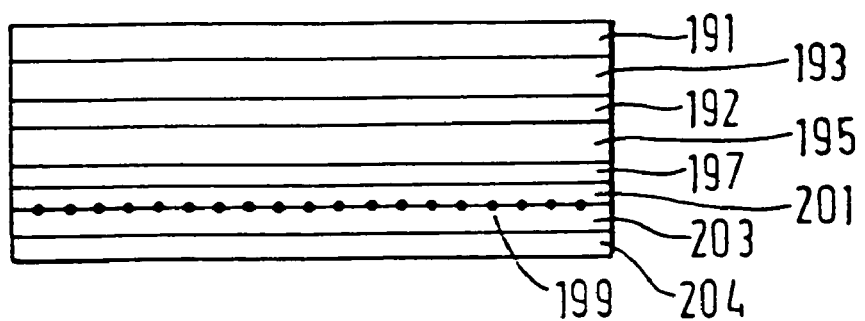
FIG. 24 schematically illustrates a cross-sectional view of the display of the personal computer shown in FIG. 23, illustrating the positional relationship between the windings of the digitising system and the liquid crystal display.

FIG. 24 shows a cross-sectional view of the liquid crystal display 183 shown in FIG. 23 taken through the line S—S. As shown, the display comprises a protective top layer 191 overlaying the liquid crystal layer 192 which is sandwiched between two layers of electrodes 193 and 195. An insulating layer 197 is provided behind the lower layer 195 of electrodes to electrically shield the electrode layer from the digitiser windings 199 which are sandwiched between two halves 201 and 203 of a substrate. In this embodiment, the windings 199 are formed in a single layer. In order to reduce the effect of any metal objects located behind the LCD display, a layer 204 of magnetically soft material, such as rubber containing ferrite powder, is provided behind the substrate layer 203.

Figure 25A:
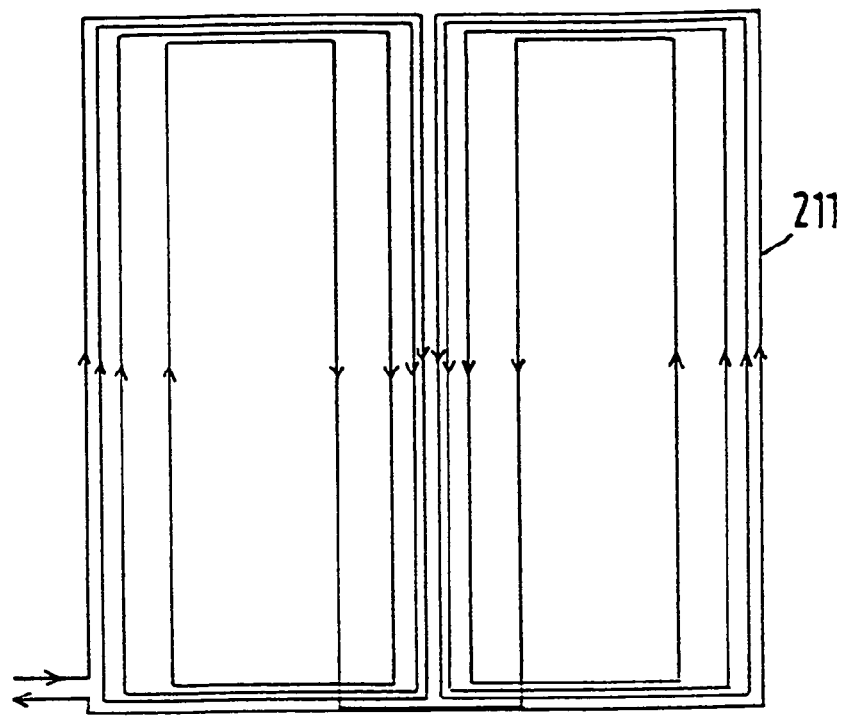
FIG. 25a illustrates the form of a single period winding which forms part of a set of windings used for sensing the position of the stylus relative to the LCD display shown in FIG. 23.
Figure 25B:
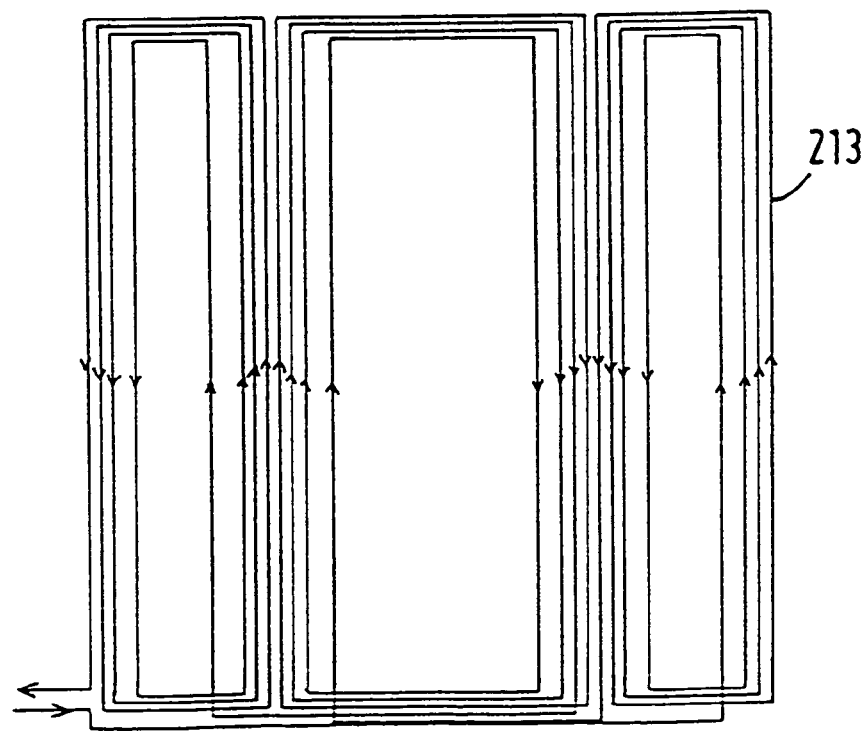
FIG. 25b illustrates the form of a second single period winding having the same period as and being in phase quadrature to the winding shown in FIG. 25a, which also forms part of the set of windings used for sensing the position of the stylus relative to the LCD display shown in FIG. 23.

FIGS. 25*a* and 25*b* schematically illustrate the form of a quadrature pair of windings 211 and 213 used in this embodiment. As shown, each of the windings 211 and 213 comprises a, single period of alternating sense loops, with each loop comprising four turns of conductor. By increasing the number of turns in each loop, the signal levels output by the windings 211 and 213 are increased. As with the windings described with reference to FIG. 4, the windings 211 and 213 are designed to generate, when energised, a magnetic field which sinusoidally varies in the X direction. Additionally, the spacing (in the X direction) between the turns of conductor forming the loops are arranged in order to try to reduce the higher order spatial harmonics of this field mentioned above. The windings 211 and 213 are arranged to extend across the entire LCD display 183, and in this embodiment extend in the X direction by 250 mm and in the Y direction by 180 mm. The fall off rate of the magnetic field generated by windings 211 or 213 is therefore much less than the fall off rate of the windings described with reference to FIG. 4. These windings can therefore be used to detect the position of the stylus over a larger gap between the windings and the stylus.

In addition to the two windings 211 and 213, a further two windings which constitute a phase quadrature pair are required for the X direction measurement. These other two windings may comprise, for example, two periods of alternating sense loops, again with each loop comprising four turns. Additionally, a further four windings will be required for the Y direction measurement. If a different number of turns are used to define each winding, then different amplifications or weightings need to be applied to the different received signals in order to compensate for this.

Figure 26:
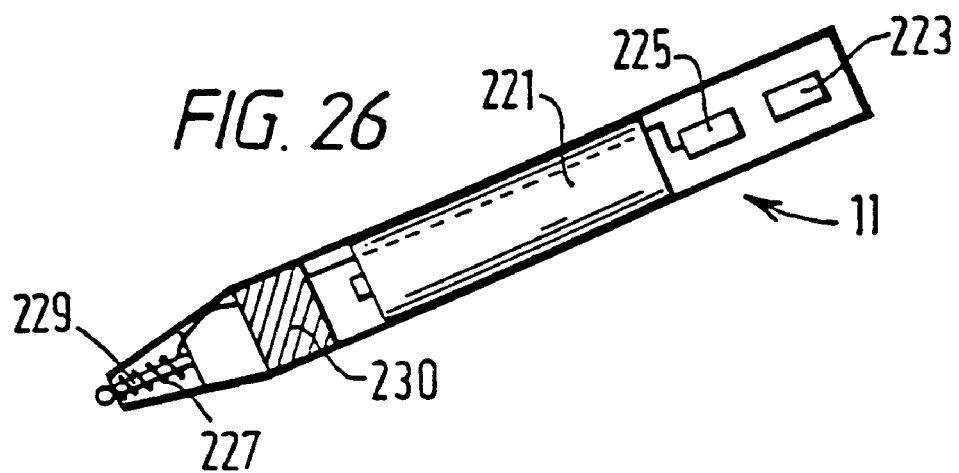
FIG. 26 schematically illustrates the form of a stylus used with the personal computer shown in FIG. 23.
Figure 27:
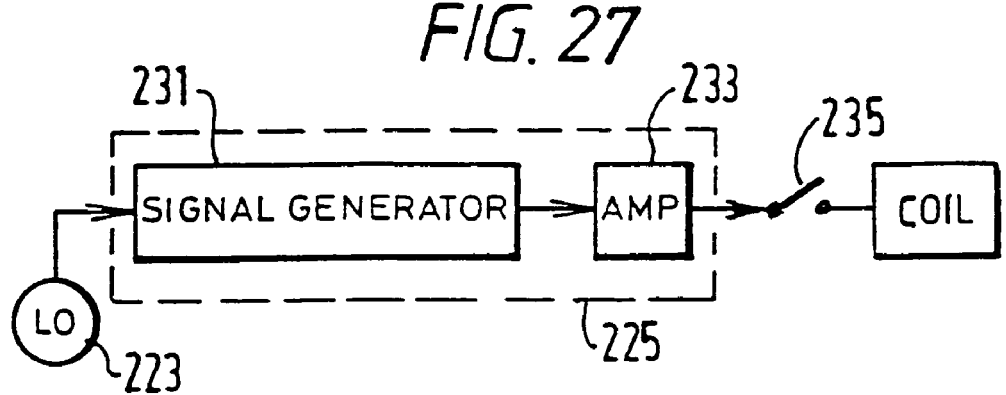
FIG. 27 is a circuit diagram illustrating the electronic components which form part of the stylus shown in FIG. 26.

As in the embodiment described with reference to FIG. 1, the stylus 11 may comprise a resonator which is energised by the windings located behind the LCD display. However, in order to save battery power of the personal computer 181, in this embodiment, the stylus 11 is preferably powered by a replaceable battery. FIG. 26 illustrates such a powered stylus 11. As shown, the stylus comprises a battery 221, an oscillator chip 223, a signal processing chip 225, a coil 227 which is wound around a ferrite core 229 and a user actuable control button 230. As shown in FIG. 27, the local oscillator 223 generates a local frequency signal which is applied to the signal processing chip 223 which comprises a signal generator 231 and an amplifier 233. The signal generator 231 generates an appropriate drive signal for application to the coil 227 and the amplifier 233 amplifies this signal prior to application to the coil 227. As shown in FIG. 27, the output signal from the amplifier is applied to the coil 227 via switch 235 which is controlled by the user actuable control button 230 shown in FIG. 26. By using the stylus described above with, for example, an AAA alkaline battery, an operating life of around one thousand hours can be achieved.

In the above embodiments, two dimensional X-Y digitising systems have been described. Some aspects of the present invention are not, however, limited to two dimensional position encoders. In particular, some aspects of the present invention can be incorporated into a one dimensional linear or rotary position encoder. FIG. 28*a* illustrates the form of a one dimensional linear position encoder 251 embodying the present invention. The encoder comprises a support 253 which carries four separate windings 254-1, 254-2, 254-3 and 254-4 which are connected to an excitation and processing circuit 255. The encoder is used for determining the position of a resonant circuit 257 which is moveable in the X direction, as represented by double headed arrow 259.

As shown in FIGS. 28*b* to 28*e*, each of the windings 254 is formed by generally hexagonal shaped loops, with adjacent loops being wound in alternate sense. As shown, windings 254-1 and 254-2 together form a phase quadrature pair and have five periods ($\lambda_3$) which extend over the measurement range. Similarly, the windings 254-3 and 254-4 also constitute a phase quadrature pair, but these windings extend for six periods ($\lambda_4$) over the measurement range. The shape of the windings 254 are arranged so that the magnetic field generated by an excitation signal applied to them varies sinusoidally with position along the X direction. In this embodiment, windings 254-3 and 254-4 are energised by the excitation and processing circuits 255 and the signals induced in windings 254-1 and 254-2 by the resonator 257 are processed to extract the resonator position in the X direction. In addition to the resonator X position, an estimate of the tilt of the resonator in the X-Z plane, ie $\alpha_X$ can be derived using the coarse position measurement and the fine position measurement phase, from equation 20 above. Additionally, it is possible to obtain a rough estimate of the height of the resonator 257 above the plane of the support 253. However, since this height also depends on the overall orientation of the resonator 257, the accuracy of the estimated height depends upon the extent of the tilt of the resonator 257 in the Y-Z plane (which cannot be determined from the measurements obtained in this embodiment).

In the above embodiments, two phase quadrature pairs of windings were used to determine the position of an object in each of the directions to be measured, and the number of periods of one pair of quadrature windings was one less than the number of periods in the other pair of quadrature windings. With this configuration, the coarse position measurement phase gives an absolute position measurement of the object over the entire active length of the digitising tablet. In an alternative embodiment, the number of periods in each of the pairs of quadrature windings may differ by more than one, in which case, the coarse position measurement will not give an absolute measurement of the object's position. If absolute position measurement is required, then this can be achieved by defining a home position against which the object can be registered in order to obtain an initial position, and then absolute position measurement is achieved by tracking the object as it is moved across the measurement area. However, this embodiment is not preferred, since the absolute position of the object is lost at power down and if the object is removed completely from the sensing range of the windings.

An alternative solution is to provide a third set of quadrature windings, again having a different pitch to the windings of the other two sets, from which it is possible to perform a Vernier type calculation in order to retrieve the absolute position of the object. Additionally, in this embodiment, when a single resonator is carried by the object, the signals induced in the three sets of windings can be used to increase the accuracy of the coarse position measurement. For example, if a ten period winding, a seven period winding and a four period winding are provided, then (i) the signals from the ten and the seven period windings can be combined to give a coarse position measurement which does not vary with the tilt of the stylus but which linearly varies three times between $-\pi$ and $\pi$ over the measurement range; (ii) the signals from the ten and the four period windings can be combined to give a coarse position measurement which does not vary with the tilt of the stylus but which linearly varies seven times between $-\pi$ and $\pi$ over the measurement range; and (iii) these two coarse position measurements can then be used in a Vernier type calculation to determine more accurately the position of the stylus in the measurement direction.

In the above embodiments, the height of the stylus above the digitising tablet was determined from the amplitude values of the signals induced in the receive windings. This measurement is, however, prone to error due to variation in the resonant frequency and the Q of the resonator, and temperature effects in the track and processing electronics (which affects the constant value A in equation 39). However, since these errors will cause the same offset in the amplitude of the signals received from the different receive windings, the height of the stylus above the digitising tablet can be calculated more accurately by using relative amplitudes of signals whose signal variation with gap is different. In other words, by taking the relative amplitudes of signals received from windings having different periods. More specifically, in the embodiment which uses a periphery mounted excitation winding, the height (Z) of the stylus above the digitising tablet can be determined by taking the ratio of the amplitudes of the signals received in the different period receive windings. In the first embodiment, however, where an excitation winding having a first period and a receive winding having a second different period is used, it is not possible to determine such a relative amplitude term as easily. In such an embodiment, three sets of periodic windings would be required, each having a different period. The signals from two sets of windings can be used to determine a first amplitude value (from equation 25) and the signals received from one of those two sets of windings and the third set of windings can be used to provide a second amplitude value. The ratio of these two amplitude values will provide an indication of the height (Z) of the stylus above the digitising tablet which is unaffected by the errors caused by the variation in the resonant frequency of the resonator and the temperature effects of the track and the processing electronics, provided the difference in the number of periods between the windings which are used to provide the amplitude measurement values is not the same.

In the above embodiments, the windings were wound around a wiring loom and then sandwiched between two halves of a substrate layer. In an alternative embodiment, the wires could be bonded onto the substrate as they are being wound in the required configuration. The bonding can be achieved by applying, for example, ultrasonic energy to the wire which melts the substrate and subsequently forms a bond with the wire when it cools.

In the above embodiments, the signals from the quadrature sets of windings were used and phase measurements were obtained by performing an arc-tangent calculation. It is possible to extract the phase information from the received signals without performing such an arc-tangent function. The applicants earlier International application WO98/00921 discloses a technique for extracting the phase information and converting it into a time varying phase. A similar processing technique could be used to extract the phase information from which the relative position of the stylus and the digitising tablet can be determined together with the relative orientation.

In each of the above embodiments, phase quadrature windings were used. This is because the amplitude of the received signals (which vary sinusoidally with the X or Y position) varies with the height (Z) of the stylus above the windings, and therefore, by taking the ratio of the quadrature signals, this amplitude variation with height can be removed and the positionally varying phase can be determined from a straight forward arc-tangent function. In an alternative embodiment, two windings which are shifted relative to each other in the measurement direction can be used. However, this embodiment is not preferred, since a more complex processing must be performed to extract the positionally varying phase. Alternatively still, three windings shifted relative to each other by one sixth of the winding pitch can be used, and in particular can be used to regenerate the quadrature output signals. Additionally, in an embodiment where, for example, the stylus is at a fixed height above the windings, the provision of the second or third shifted winding is not essential, because the amplitude of the sinusoidal variation does not vary. Therefore the positional information can be determined using the output signals from the different period windings.

In the above two dimensional embodiments, the windings used for determining the X an Y positions and the orientation, were formed in mutually orthogonal directions. This is not essential. All that is required in these embodiments is that there are two groups of windings which measure the position and orientation in two different directions, from which the X and Y positions can be determined and from which the orientation can be determined.

In the first embodiment, windings having five and six periods were used. The number of periods used is a design choice and can be varied to optimise the resolution, accuracy and range of the system. The resolution and accuracy can be improved with more periods (up to a limit), but the practical operating range is typically a third of the pitch of the windings. Therefore, in the first embodiment six periods over an active length of 300 mm, the maximum practical operating range is approximately 17 mm.

The invention claimed is:

1. A positioning system comprising:
a substantially planar array of x-y coils;
an electromagnetic field generator whose height above the planar x-y coils can vary and operable to generate an electromagnetic field; and
processing circuitry coupled to the substantially planar x-y coils and operable to process signals generated by the x-y coils in response to the electromagnetic field generated by said field generator when said field generator is within a sensing range of the positioning system, to determine a measure of the height of the field generator above the planar coils within said sensing range.

2. A system according to claim 1 comprising a plurality of x sensor coils and a plurality of y sensor coils.

3. A system according to claim 1 wherein said processing circuitry is also operable to process said generated signals to determine an x-y position of said field generator relative to said x-y sensor coils.

4. A system according to claim 3 wherein said processing circuitry is operable to determine the x-y position of said field generator over a predetermined measurement area.

5. A system according to claim 4 wherein the or each x sensor winding and the or each y sensor winding extends substantially over the entire measurement area.

6. A system according to claim 5 wherein the or each x sensor winding and the or each y sensor winding comprises at least two loops connected in series and arranged so that a signal generated in the first loop opposes the signal generated in a second loop by a common background electromagnetic field.

7. A system according to claim 1 wherein said signal generator is operable to generate an alternating magnetic field which induces alternating signals in said x-y sensor coils and wherein said processing circuitry is operable to determine an amplitude measure for the signal generated in one or more of said sensor coils and is operable to determine said height measure from said amplitude measure.

8. A system according to claim 7 wherein said processing circuitry is operable to combine the signals generated in two of the sensor coils to provide an amplitude measure which varies with the height of the signal generator above the planar x-y sensor windings and wherein said processing circuitry is operable to determine said height measure from said amplitude measure.

9. A system according to claim 7 wherein said processing circuitry is operable i) to determine a first amplitude measure of a signal generated in a first one of said sensor coils; ii) to determine a second amplitude measure of a signal generated in a second one of said sensor coils; iii) to take a ratio of first and second amplitude measures; and iv) to determine said height measure using said ratio.

10. A system according to claim 1 wherein said signal generator comprises a magnetic field generator operable to generate an alternating magnetic field.

11. A system according to claim 1 wherein said electromagnetic field generator comprises an electromagnetic resonator and further comprising an energizing circuit for energizing said resonator.

12. A system according to claim 11 wherein said energizing circuit comprises one or more of said x-y coils.

13. A positioning system comprising:
a planar array of x-y sensor coils distributed over an x-y measurement area;
a field generator which is movable relative to said planar array of x-y coils and which is operable to generate an electromagnetic field; and
processing circuitry coupled to said x-y sensor coils and operable to process signals generated in x-y sensor coils in response to the electromagnetic field generated by said field generator, when said field generator is within a sensing range of the positioning system, to determine the x-y position of said field generator within said x-y measurement area and to determine a measure of height of the field generator from the planar array of x-y sensor coils within said sensing range;
wherein said signals generated in said x-y sensor coils vary with the x-y position and said height, wherein said processing circuitry is operable to combine the signals generated in two or more of said sensor coils to derive an amplitude measure which is independent of said x-y position and which varies with said height and wherein said processing circuitry is operable to process said amplitude measure to determine said height measure of the field generator relative to said planar coils.

14. A system according to claim 13 comprising a sin x sensor circuit and a cos x sensor circuit which are operable to generate signals which vary in quadrature with the x position of the field generator relative to said x-y measurement area and wherein said processing circuitry is operable to take the square of a signal generated by the sin x sensor circuit and the square of a signal generated in the cos x sensor circuit and to add the results to provide said amplitude measure, from which said height measure of the field generator relative to said planar coils is determined.

15. A system according to claim 13 wherein said processing circuitry is operable i) to determine a first amplitude measure of a signal generated in a first one of said sensor coils; ii) to determine a second amplitude measure of a signal generated in a second one of said sensor coils; iii) to take a ratio of said first and second amplitude measures; and iv) to determine said height measure using said ratio.

16. A system according to claim 13 wherein said field generator comprises a powered coil.

17. A system according to claim 13 wherein said field generator comprises a resonator and further comprising an energizing circuit for energizing said resonator.

* * * * *